(12) United States Patent
Kai et al.

(10) Patent No.: US 9,705,565 B2
(45) Date of Patent: *Jul. 11, 2017

(54) NON-CONTACT POWER SUPPLY DEVICE

(71) Applicant: NISSAN MOTOR CO., LTD., Yokohama-shi, Kanagawa (JP)

(72) Inventors: Toshihiro Kai, Yamato (JP); Yuya Yamauchi, Kanagawa (JP); Throngnumchai Kraisorn, Yokohama (JP); Yuusuke Minagawa, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 629 days.

This patent is subject to a terminal disclaimer.

(21) Appl. No.: 14/347,385

(22) PCT Filed: Sep. 28, 2012

(86) PCT No.: PCT/JP2012/075141
§ 371 (c)(1),
(2) Date: Mar. 26, 2014

(87) PCT Pub. No.: WO2013/047776
PCT Pub. Date: Apr. 4, 2013

(65) Prior Publication Data
US 2014/0239736 A1    Aug. 28, 2014

(30) Foreign Application Priority Data

Sep. 28, 2011    (JP) ................................ 2011-212223

(51) Int. Cl.
*H04B 5/00* (2006.01)
*B60L 11/18* (2006.01)
(Continued)

(52) U.S. Cl.
CPC .......... *H04B 5/0037* (2013.01); *B60L 11/182* (2013.01); *B60L 11/1833* (2013.01);
(Continued)

(58) Field of Classification Search
CPC .............................. H02J 5/005; H04B 5/0037
See application file for complete search history.

(56) References Cited

U.S. PATENT DOCUMENTS 8,164,925 B2    4/2012 Abe et al.
8,716,976 B2    5/2014 Kai et al.
(Continued)

FOREIGN PATENT DOCUMENTS

EP    2 348 610 A1    7/2011
EP    2 395 628 A1    12/2011
(Continued)

OTHER PUBLICATIONS

USPTO Office Action, U.S. Appl. No. 14/417,991, filed Dec. 13, 2016, 15 pages.
(Continued)

*Primary Examiner* — Jeffrey Shin
(74) *Attorney, Agent, or Firm* — Foley & Lardner LLP

(57)    ABSTRACT

A non-contact power supply device comprises: a primary winding (101); and a secondary winding (201) to which an electric power is supplied from an alternating current power supply via the primary winding, wherein an impedance characteristic of Z1 with respect to a frequency is such that a minimal value is provided in the proximity of a frequency of a fundamental wave component of the alternating current power supply and another impedance characteristic of Z2 with respect to the frequency is such that the frequency of the fundamental wave component is provided between the frequency which is nearest to the frequency of the fundamental wave component and at which a maximal value is
(Continued)

provided and the frequency which is nearest to the frequency of the fundamental wave component and at which the minimal value is provided.

7 Claims, 36 Drawing Sheets

(51) Int. Cl.
| | | |
|---|---|---|
| *H02J 5/00* | (2016.01) | |
| *H02J 7/02* | (2016.01) | |
| *H02J 50/10* | (2016.01) | |

(52) U.S. Cl.
CPC .............. *H02J 5/005* (2013.01); *H02J 7/025* (2013.01); *B60L 2210/10* (2013.01); *B60L 2210/30* (2013.01); *B60L 2210/40* (2013.01); *H02J 50/10* (2016.02); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | |
|---|---|---|
| 2009/0299216 A1 | 12/2009 | Chen et al. |
| 2010/0033156 A1 | 2/2010 | Abe et al. |
| 2010/0096976 A1 | 4/2010 | Park |
| 2011/0316348 A1 | 12/2011 | Kai et al. |
| 2012/0043930 A1 | 2/2012 | Scudiere |
| 2012/0049791 A1 | 3/2012 | Tanabe |
| 2012/0056580 A1 | 3/2012 | Kai et al. |
| 2012/0086283 A1 | 4/2012 | Yamamoto et al. |
| 2012/0319479 A1 | 12/2012 | Covic et al. |
| 2013/0027078 A1 | 1/2013 | Nakano et al. |
| 2013/0043737 A1 | 2/2013 | Yeo et al. |
| 2013/0271222 A1 | 10/2013 | Choi et al. |
| 2015/0015197 A1 | 1/2015 | Mi et al. |
| 2015/0171167 A1* | 6/2015 | Nourbakhsh ....... H01L 29/1606 257/29 |
| 2015/0280445 A1 | 10/2015 | Yamakawa et al. |

FOREIGN PATENT DOCUMENTS

| | | |
|---|---|---|
| EP | 2 432 098 A1 | 3/2012 |
| JP | 2001-238372 A | 8/2001 |
| JP | 2010-253848 A | 11/2010 |
| JP | 2010-288441 A | 12/2010 |
| JP | 4644827 B2 | 3/2011 |
| JP | 2012-055045 A | 3/2012 |
| JP | 2012-120288 A | 6/2012 |
| WO | WO 2007/029438 A1 | 3/2007 |
| WO | WO 2010/101078 A1 | 9/2010 |
| WO | WO 2010/131732 A1 | 11/2010 |

OTHER PUBLICATIONS

USPTO Notice of Allowance, U.S. Appl. No. 14/417,991, May 8, 2017, 14 pages.

* cited by examiner

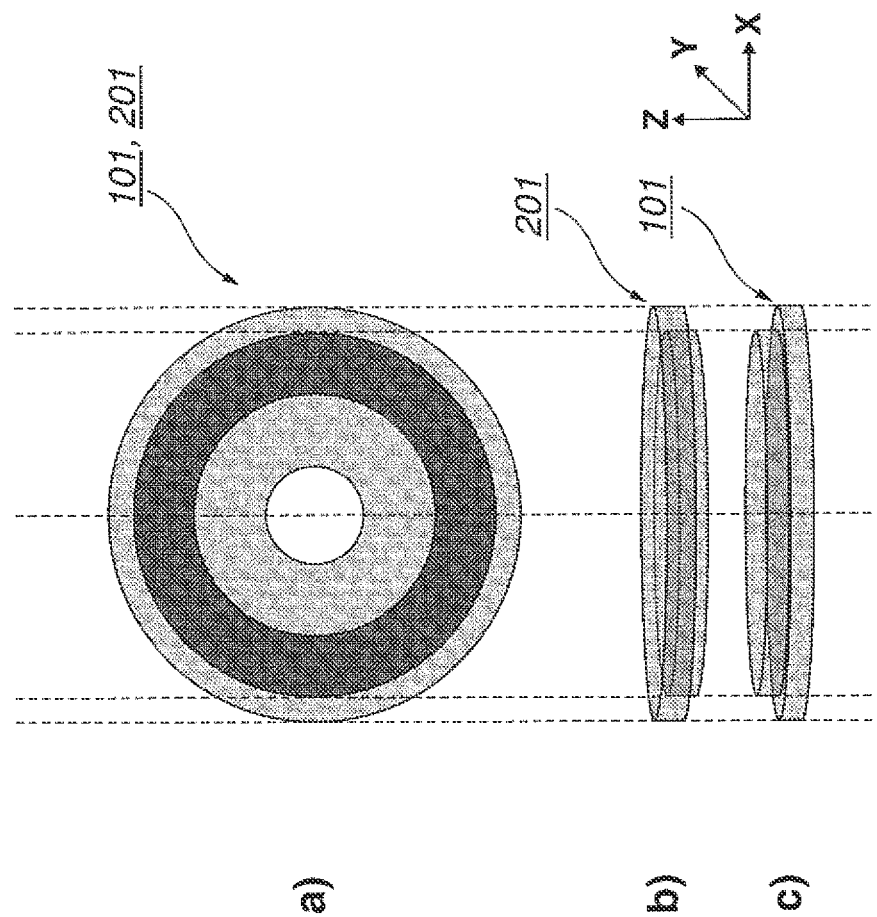

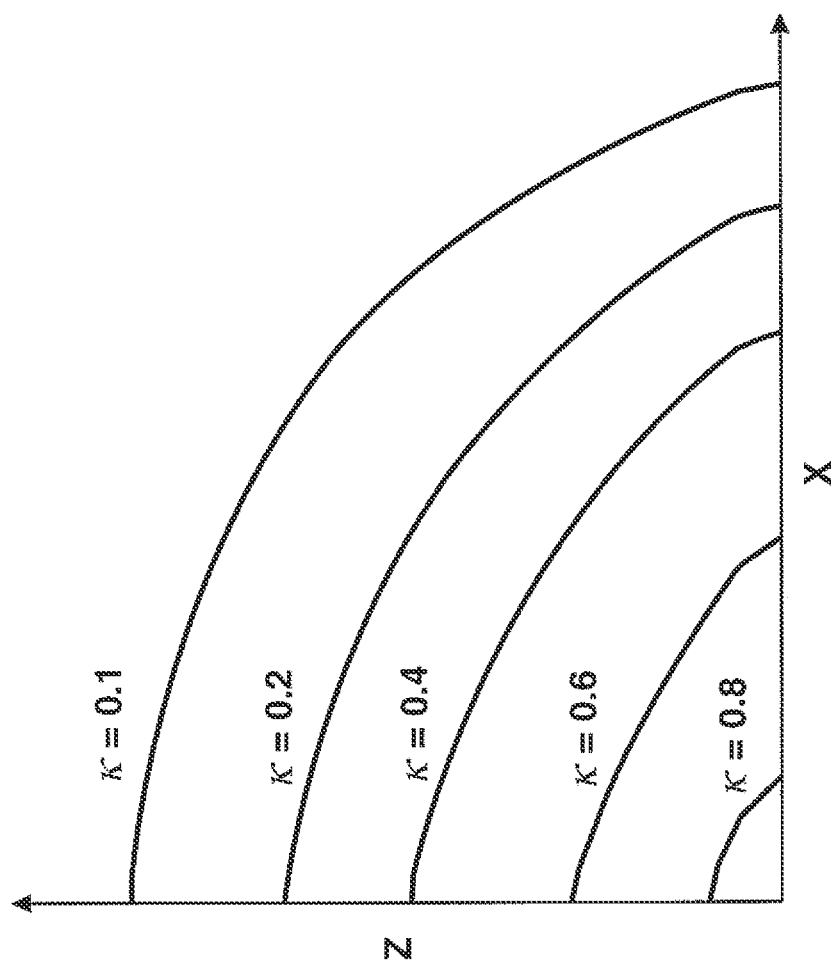

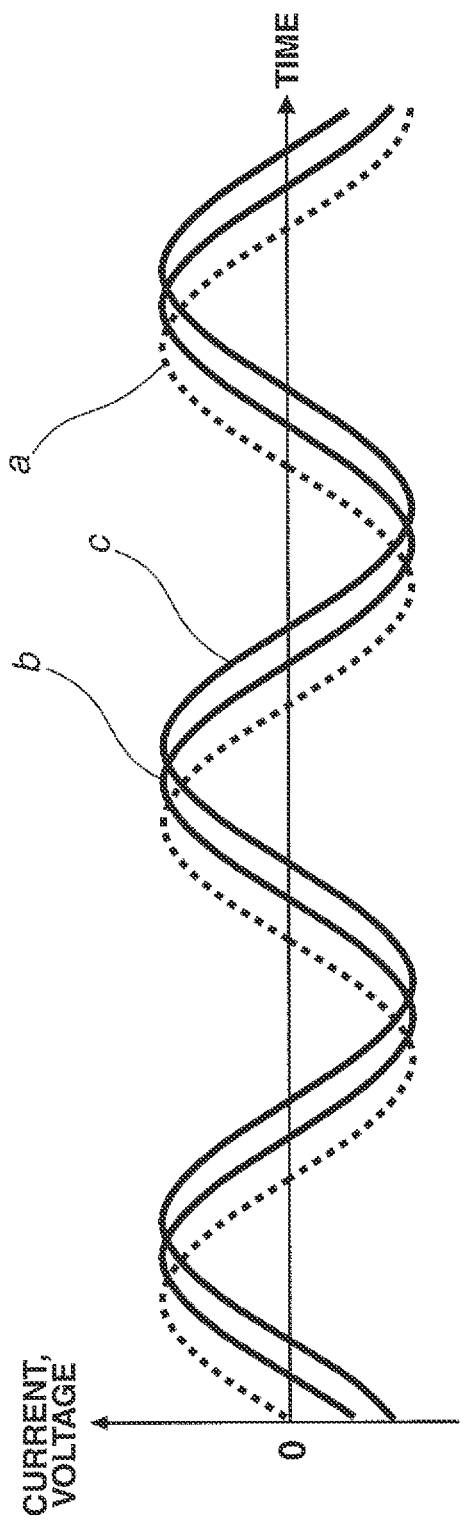

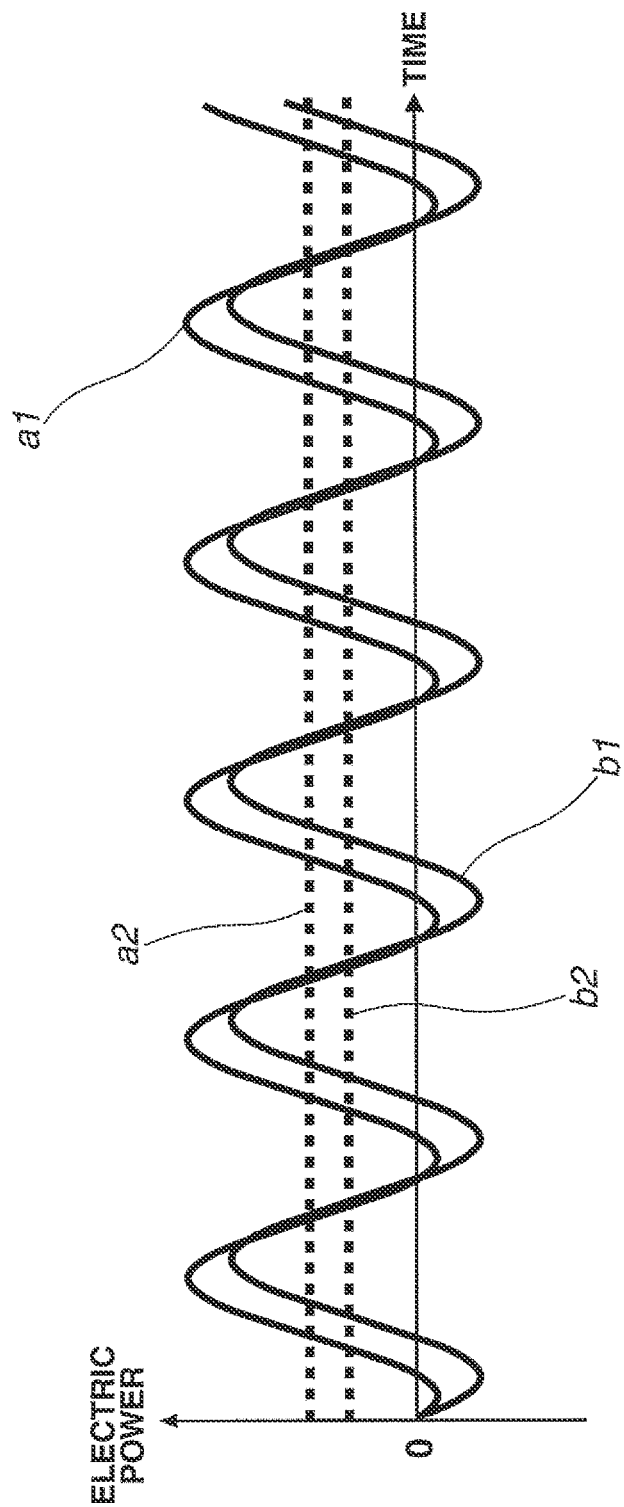

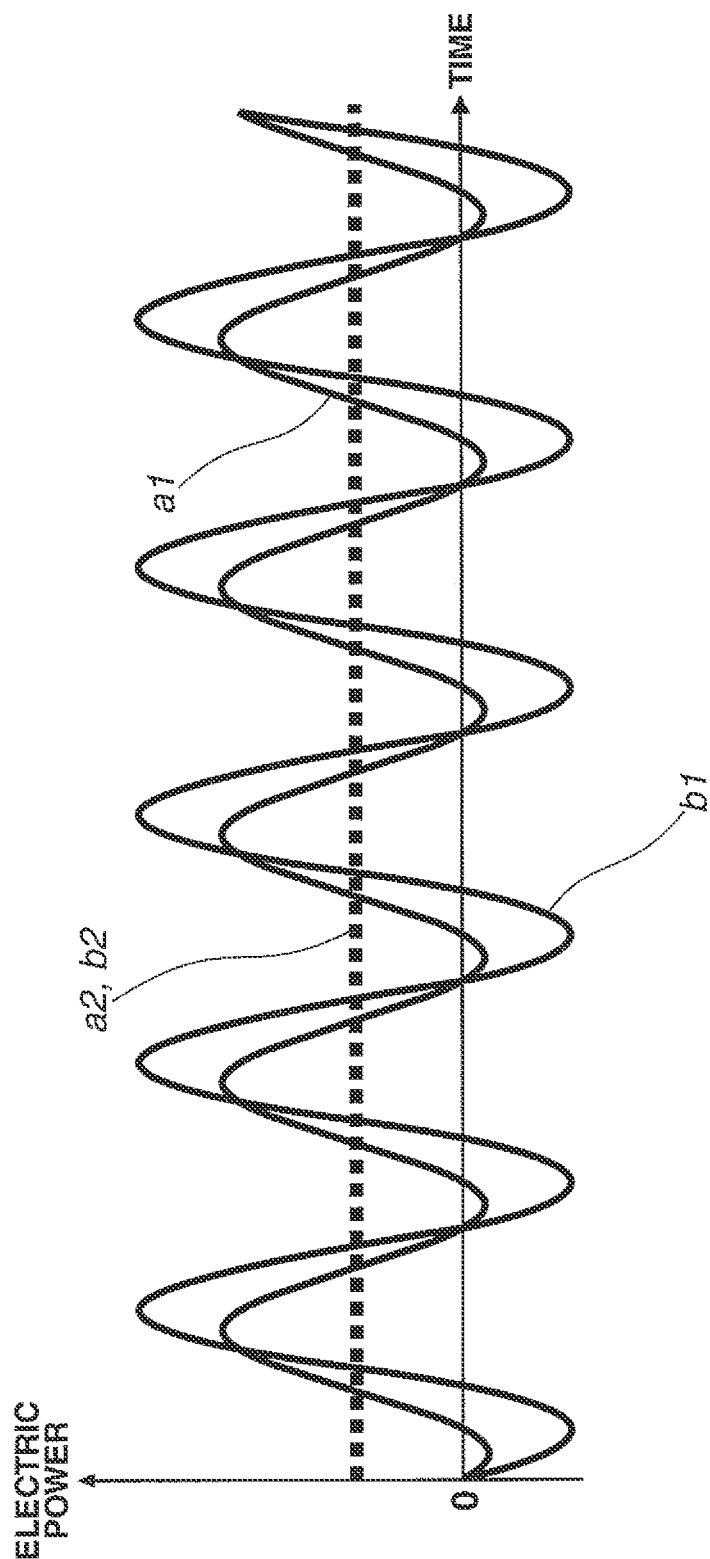

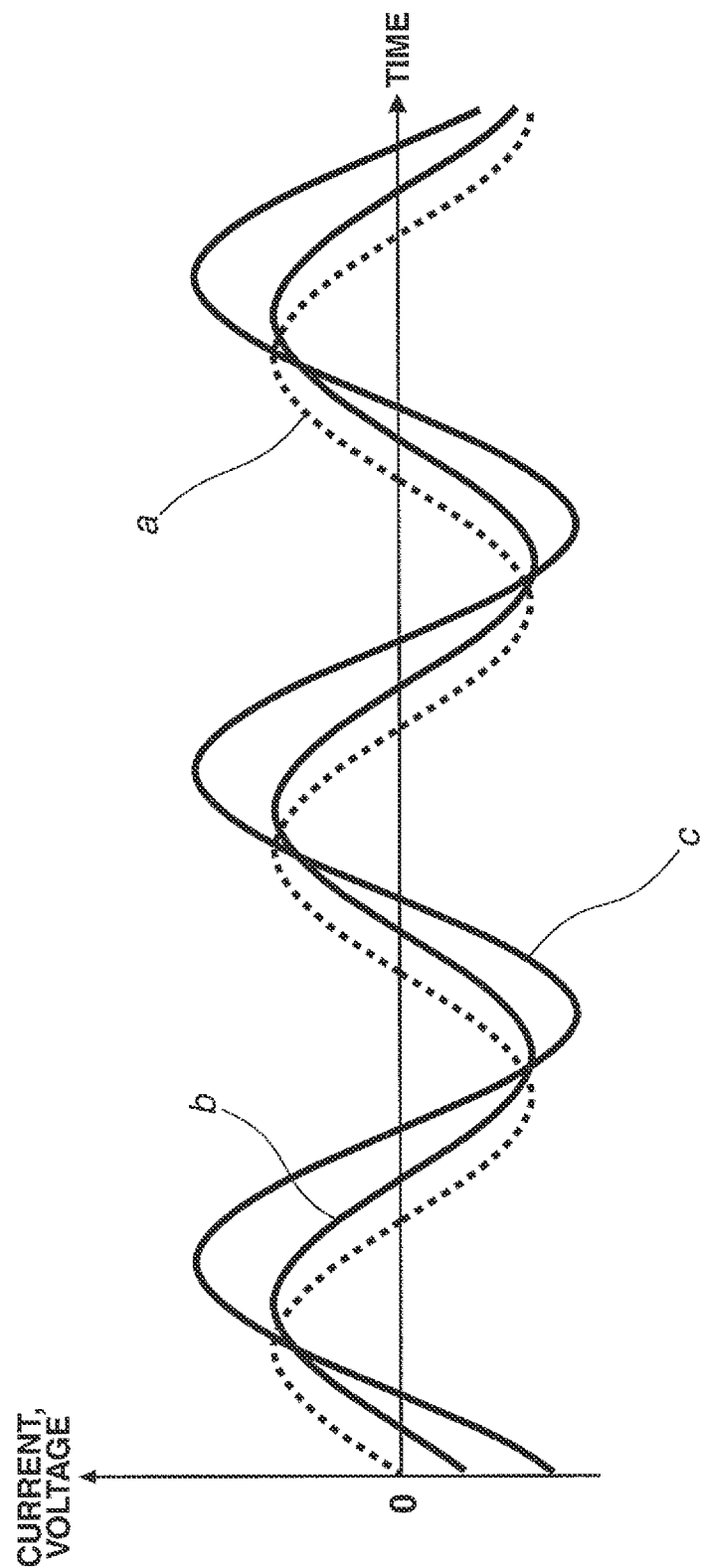

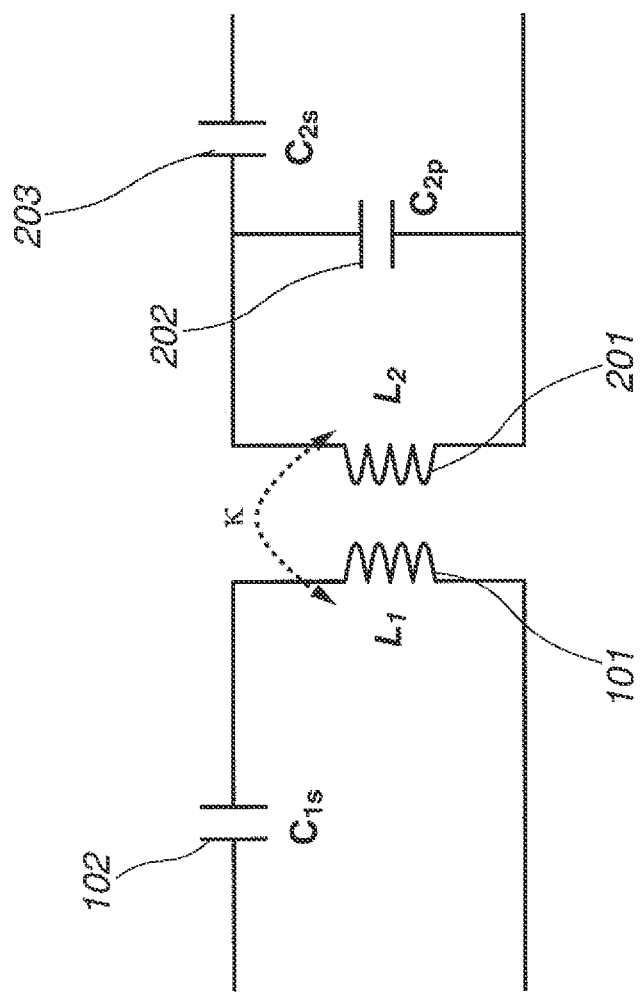

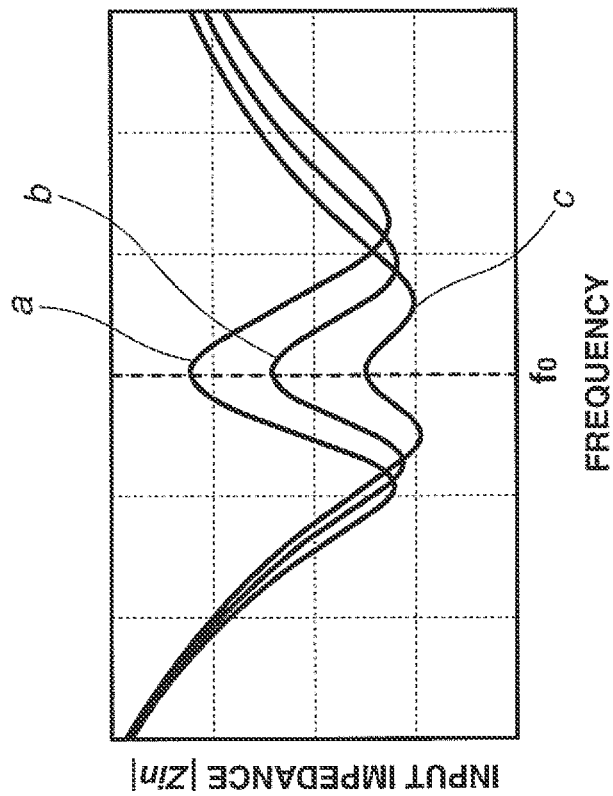

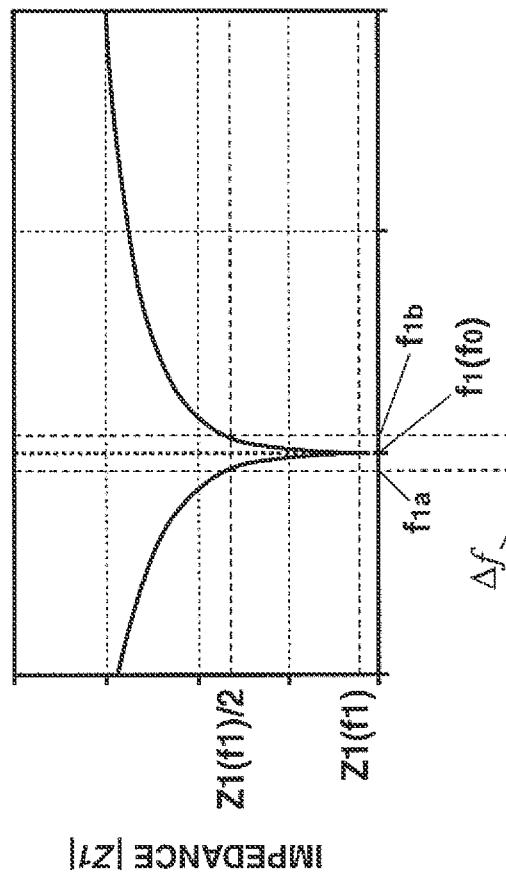
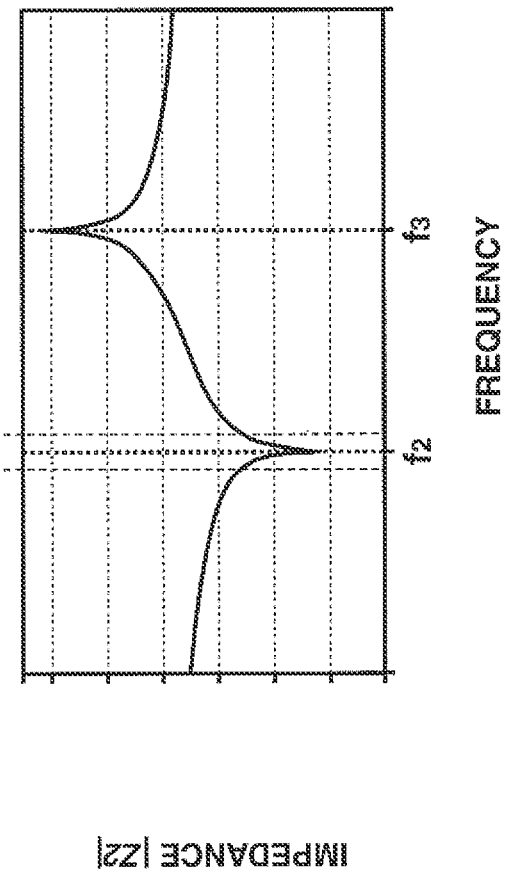
FIG. 18(a)
FIG. 18(b)

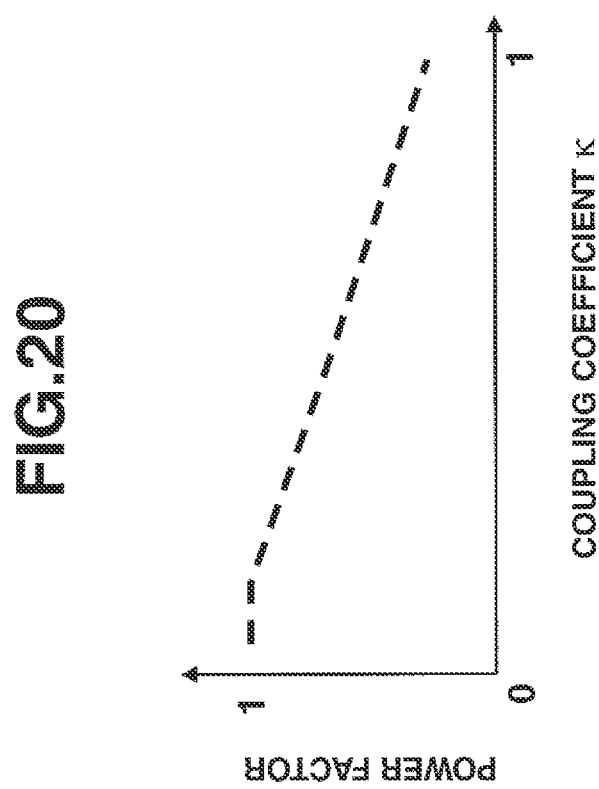

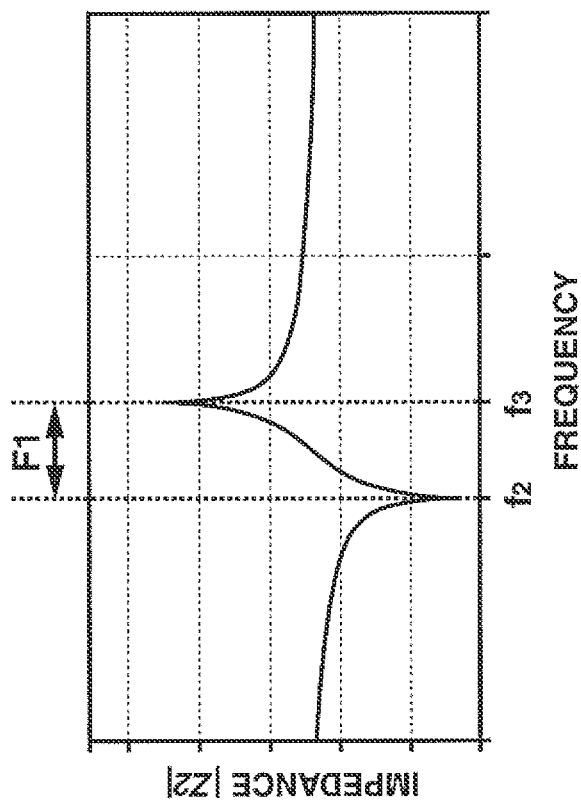

NON-CONTACT POWER SUPPLY DEVICE

TECHNICAL FIELD

The present invention relates to a non-contact power supply device.

BACKGROUND ART

A previously proposed non-contact power supply device in which a serial capacitor is connected to a primary winding driven by means of an alternating current power supply, a parallel capacitor is connected to a secondary winding, and values of these capacitors are set on a basis of a mathematical equation disclosed in Patent Document 1 described below so that this transformer is substantially equivalent to an ideal transformer is known (Patent Document 1).

However, since the values of these capacitors are set with a prerequisite such that a coupling coefficient between the primary winding and the secondary winding is constant so as to achieve a high efficiency, such a problem that a power factor is reduced in a case where the coupling coefficient is varied.

Pre-Published Document

Patent Document 1: Japanese Patent No. 4,644,827

DISCLOSURE OF THE INVENTION

It is, therefore, an object of the present invention to provide a non-contact power supply device which suppresses a reduction of the power factor even when the coupling coefficient is varied.

The above-described object can be achieved by the present invention such that an impedance characteristic of Z1 with respect to a frequency is such that a minimal value is provided in the proximity of a frequency of a fundamental wave component of an alternating current power supply and another impedance characteristic of Z2 with respect to the frequency is such that the frequency of the fundamental wave component of the alternating current power supply is provided between the frequency which is nearest to the frequency of the fundamental wave component and at which a maximal value is provided and the frequency which is nearest to the frequency of the fundamental wave component and at which a minimal value is provided.

According to the present invention, even if a coupling coefficient is varied, a variation width of a phase of the impedance viewed from an output side of the alternating current power supply with respect to the fundamental wave frequency ($f_0$) is small. As a consequence of this, a reduction in a power factor can be suppressed.

BRIEF DESCRIPTION OF THE DRAWINGS

FIG. 3 is a graph representing a characteristic of a coupling coefficient with respect to a distance between the primary winding and the secondary winding of FIG. 1.

FIG. 4a is a graph explaining a power factor and representing a current characteristic and a voltage characteristic with respect to time.

FIG. 4b is a graph explaining the power factor and representing an electric power characteristic with respect to time.

FIG. 5a is a graph explaining the power factor and representing the electric power characteristic with respect to time.

FIG. 5b is a graph explaining the power factor and representing the current characteristic and the voltage characteristic with respect to time.

FIG. 6 is a circuit diagram of a non-contact power supply section shown in FIG. 1.

FIG. 11a is a graph representing an absolute characteristic of an input impedance (Zin) with respect to a frequency in the non-contact power supply section shown in FIG. 1.

FIGS. 18(a) and 18(b) are graphs representing impedance characteristics of the non-contact power supply section of the non-contact power supply device related to a second preferred embodiment according to the present invention, FIG. 18(a) being a graph representing an absolute valve characteristic of an impedance (Z1) only of the primary side and FIG. 18(b) being a graph representing an absolute value characteristic of an impedance (Z2) only of the secondary side.

being a graph representing the absolute valve characteristic of an impedance (Z1) only of the primary side and FIG. 18(b) being a graph representing the absolute characteristic of an impedance (Z2) only of the secondary side.

FIG. 20 is a characteristic graph representing the characteristic of the power factor with respect to coupling coefficient κ in the non-contact power supply device in the second comparative example.

Figures 21A, 21B:
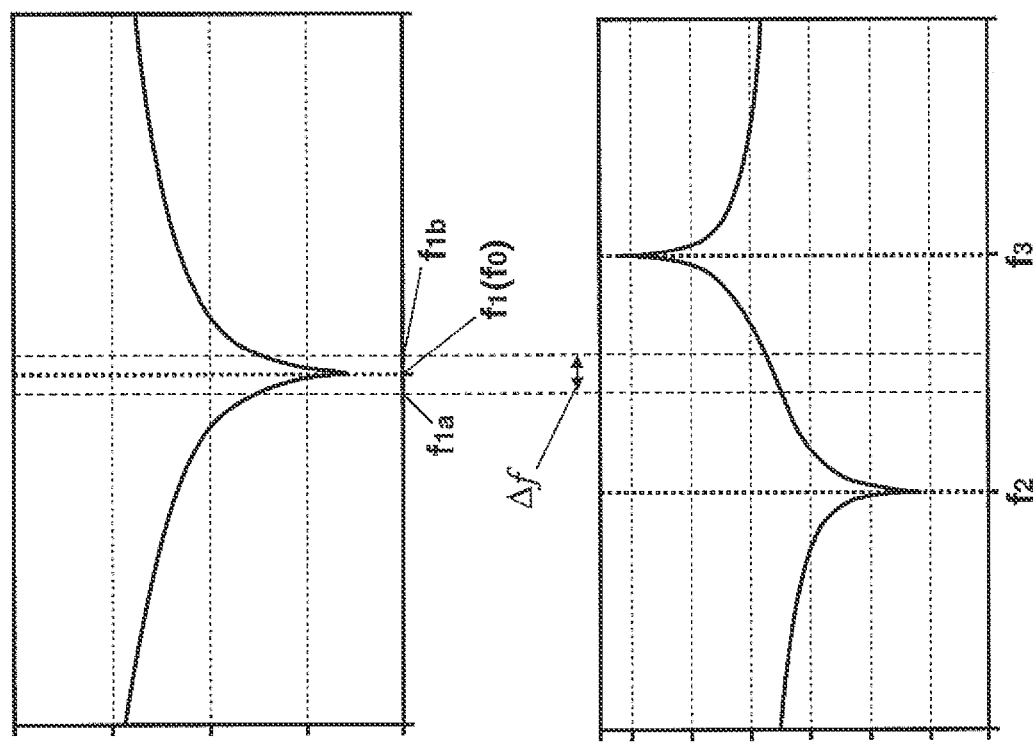

FIG. 21 is a characteristic graph of the power factor with respect to coupling coefficient κ in the non-contact power supply device related to the second comparative example, FIG. 21(a) being a graph of the absolute value characteristic of the impedance (Z1) only of the primary side and FIG. 21(b) being a graph of the absolute value characteristic of the impedance (Z2) only of the secondary side.

Figure 22:
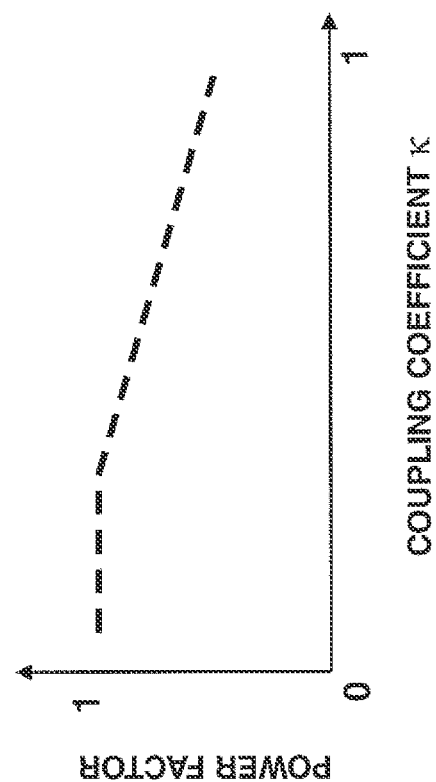

FIG. 22 is a characteristic graph representing the power factor with respect to coupling coefficient κ in the second comparative example.

Figure 23:
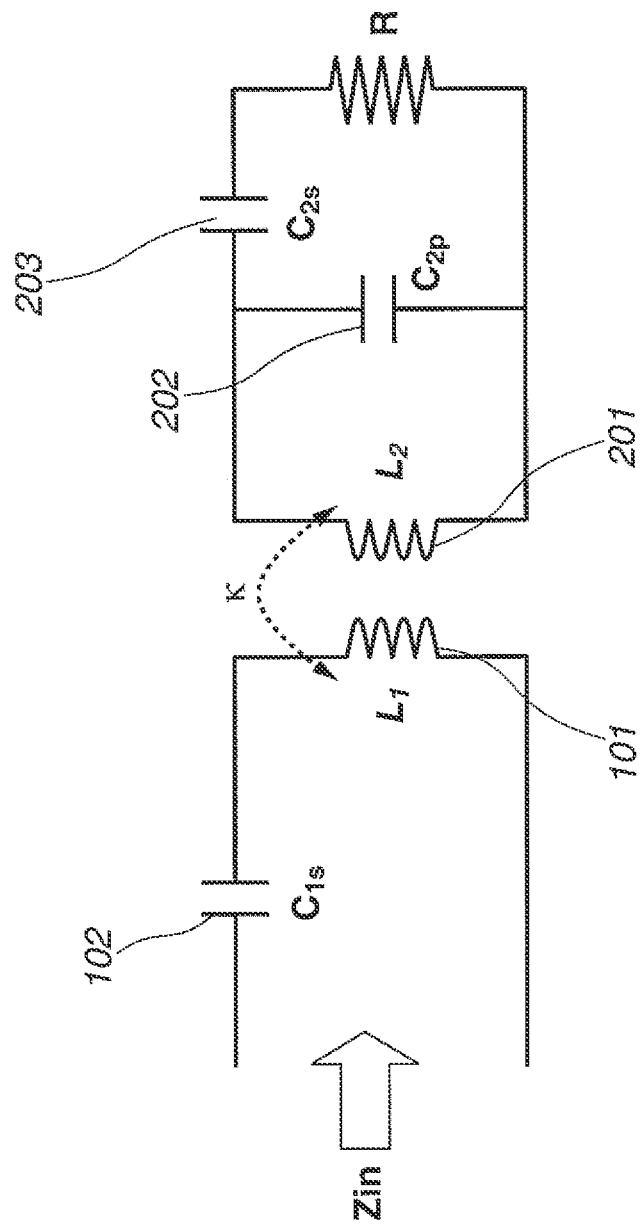

FIG. 23 is a circuit diagram representing an equivalent circuit of the non-contact power supply section in the non-contact power supply device in a third preferred embodiment according to the present invention.

Figure 24:
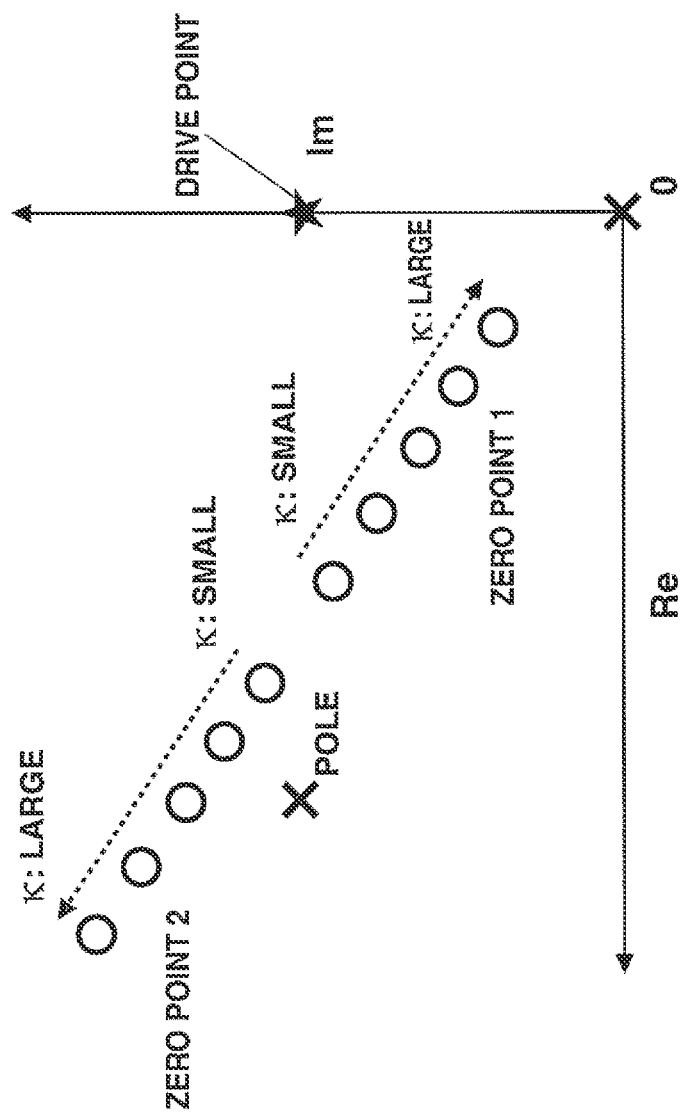

FIG. 24 is a characteristic graph of impedance (Zin) of the non-contact power supply section shown in FIG. 23 in a complex plane.

FIG. 25a is a characteristic graph representing an absolute value characteristic of the impedance of a circuit of only the secondary side in the non-contact power supply section of the non-contact power supply device related to a fourth preferred embodiment according to the present invention.

Figure 25B:
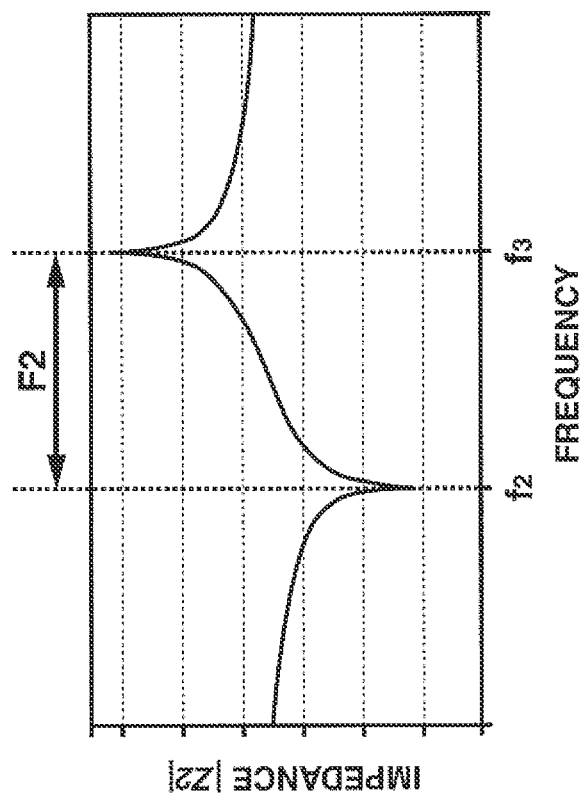

FIG. 25b is a characteristic graph representing an absolute value characteristic of the impedance of a circuit of only the secondary side in the non-contact power supply section of the non-contact power supply device related to the fourth preferred embodiment according to the present invention.

Figure 26:
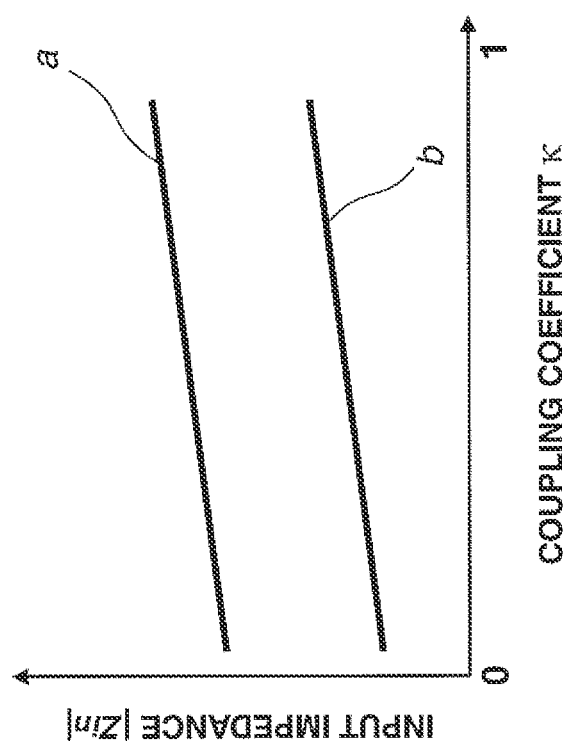

FIG. 26 is a characteristic graph representing the absolute value characteristic of input impedance (Zin) with respect to the coupling coefficient in the non-contact power supply device related to the fourth preferred embodiment.

Figure 27:
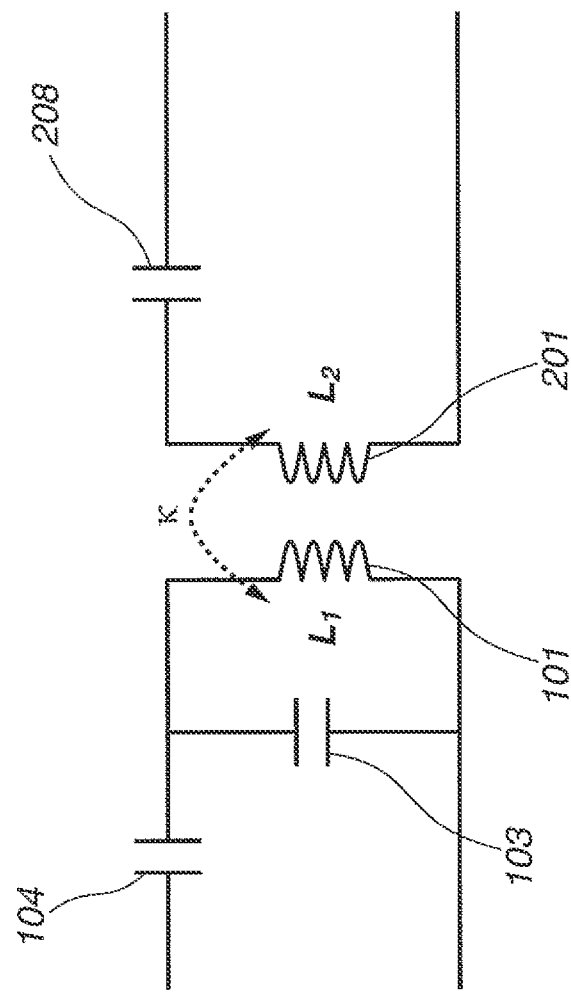

FIG. 27 is a circuit diagram representing the non-contact power supply section of the non-contact power supply device in a fifth preferred embodiment according to the present invention.

Figure 28:
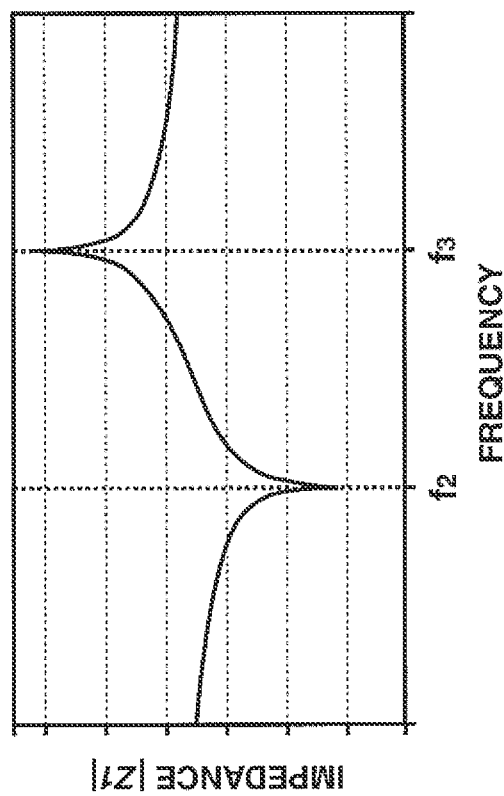

FIG. 28 is a graph representing an absolute value characteristic of the impedance (Z1) of only the primary side in the non-contact power supply section shown in FIG. 27.

Figure 29:
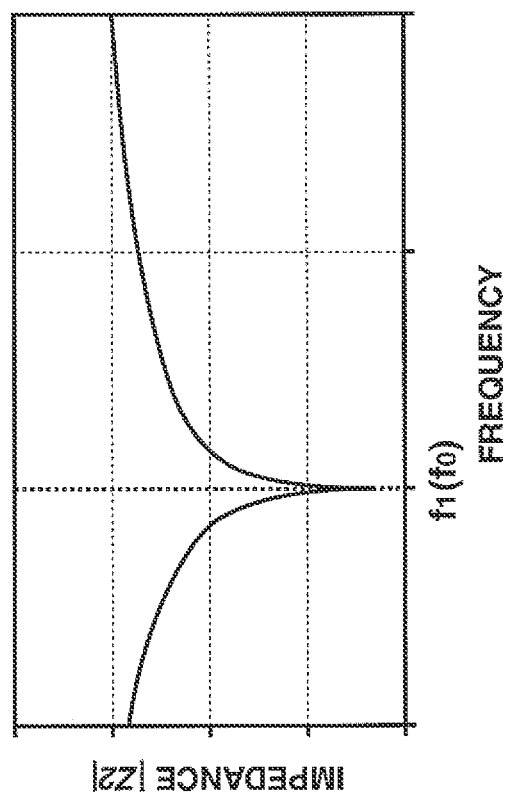

FIG. 29 is a graph representing an absolute value characteristic of the impedance (Z2) only at the secondary side in the non-contact power supply device shown in FIG. 27.

Figure 30:
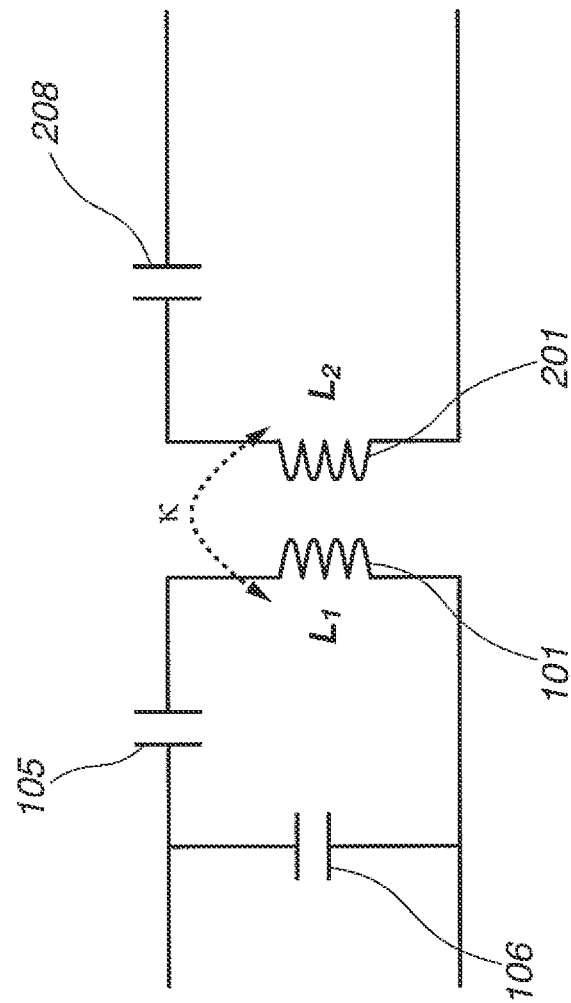

FIG. 30 is a circuit diagram of the non-contact power supply device related to a modification of the non-contact power supply device shown in FIG. 27.

Figure 31:
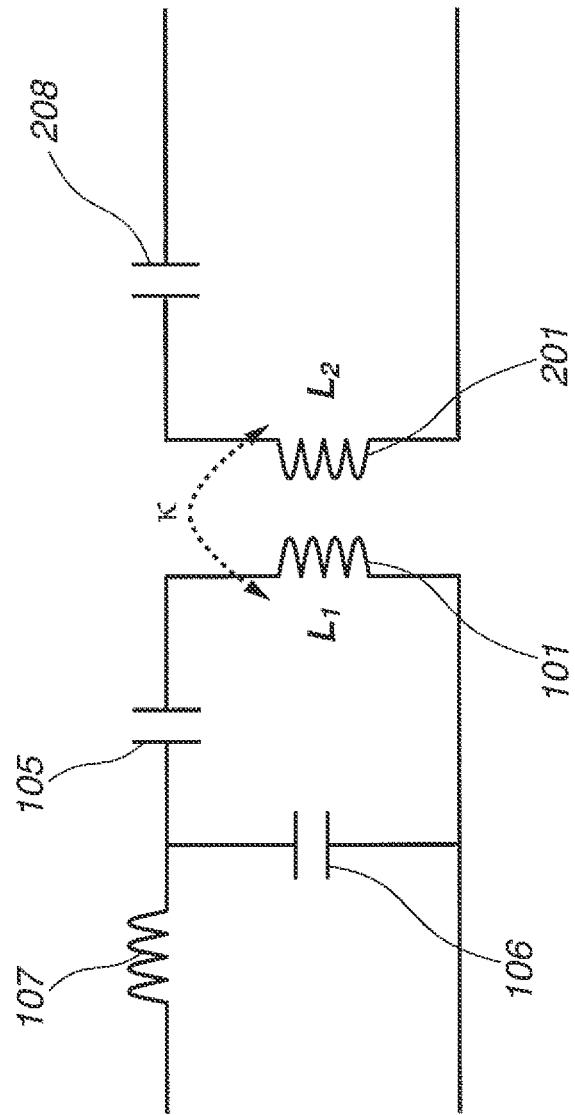

FIG. 31 is a circuit diagram of the non-contact power supply device related to another modification of the non-contact power supply device shown in FIG. 27.

EMBODIMENTS FOR CARRYING OUT THE INVENTION

Hereinafter, preferred embodiments according to the present invention will be described on a basis of drawings.

First Preferred Embodiment

As an example of a non-contact power supply device in the preferred embodiment, the non-contact power supply device used together with a vehicle battery and a power load of an electric automotive vehicle or so forth will be described below.

Figure 1:
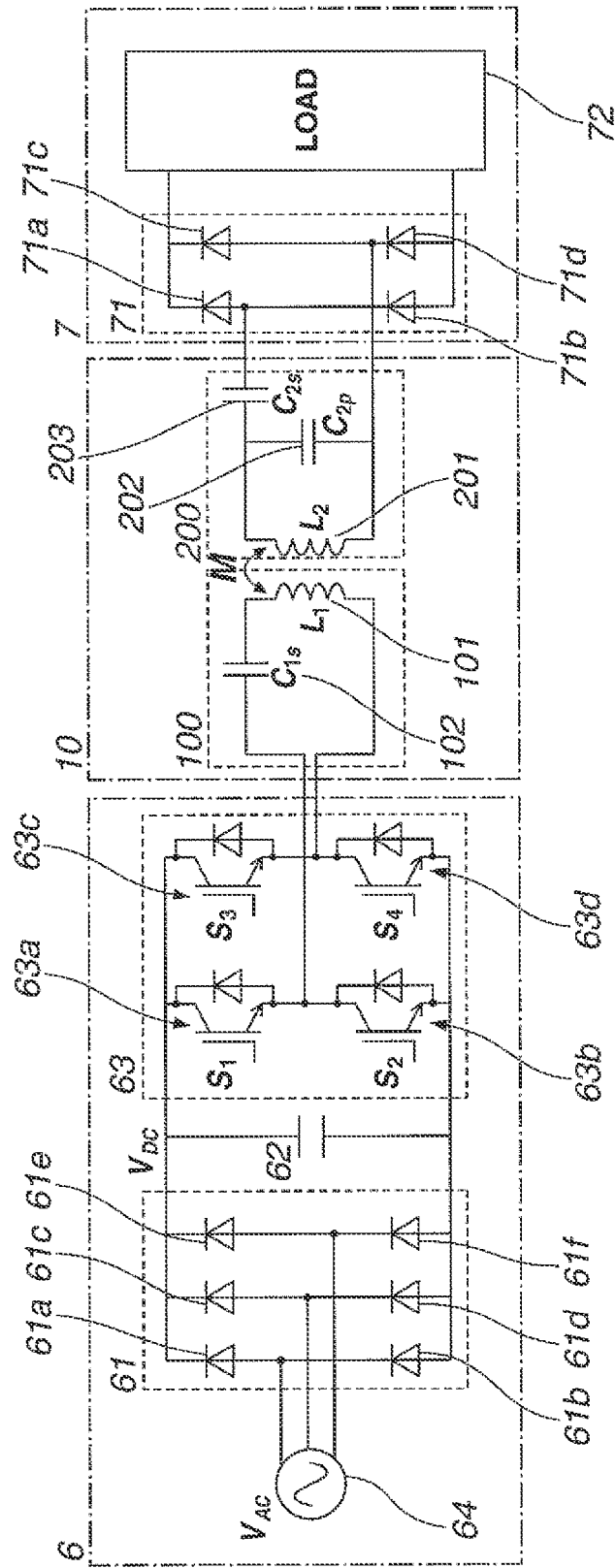
FIG. 1 is an electrical circuit diagram of a non-contact power supply device in a first preferred embodiment according to the present invention.

FIG. 1 shows an electrical circuit diagram of a non-contact power supply device in a first preferred embodiment. The non-contact power supply device in this embodiment includes: a high-frequency alternating current power supply 6; a non-contact (or contactless) power supply section 10 performing a non-contact (contactless) power supply for an electric power outputted from high-frequency alternating current power supply 6; and a load section 7 to which an electric power is supplied by means of non-contact power supply section 10.

High-frequency alternating current power supply 6 includes: a three-phase alternating current power supply 64; a rectifier 61 rectifying a three-phase alternating current into a direct current; and a voltage type inverter S3 connected to rectifier 61 to inversely convert the rectified current to a high-frequency electric power.

Rectifier 61 connected so that three of diode rays in parallel to one another, one diode ray being diodes 61a, 61b, a middle diode ray being diodes 61c, 61d, and a third diode ray being diodes 61e, 61f. An intermediate point of each ray is connected to an output of three phase alternating current power supply 64. Voltage type inverter 63 includes; a serial circuit of a switching element 63a having a a power transistor such as a MOSFET and a inversely connected diode, the serial circuit: of switching element 63b; and another serial circuit of another switching element 63b having the power transistor such as a MOSFET and an inversely connected diode, a second serial circuit of the switching element 63c having the power transistor such as the MOSFET and the diode; and another serial circuit having the same connection diagram with switching element 61d and the inversely connected diode.

Voltage type inverter 63 is connected to rectifier 61 via a smoothing capacitor 62. An intermediate connection point between switching elements 63a and 63b and intermediate connection point between switching elements 63c and 63d are connected to a power transmission circuit section 100 which is a primary side of non-contact power supply device 10. Voltage type inverter 63 supplies the alternating current electric power to non-contact power supply section 100 having an alternating current power of approximately several kHz through 100 kHz.

Non-contact power supply section 10 includes: a power transmitting circuit section 100 which is an input of a transformer; and a power receiving section 200 which is an output side of the transformer. Power transmission circuit 100 includes: a primary winding 101 and a capacitor ($C_{1s}$) 102 connected in parallel to secondary winding 201; and another capacitor ($C_{2s}$) 203 serially connected to a parallel circuit of secondary winding 201 and capacitor 202.

Load section 7 includes: a rectifying section 71 which rectifies the alternating current electric power supplied by means of non-contact power supply section 10 to the direct current; and a load 72 connected to rectifying section 71. Rectifying section 71 is arranged such that a serial circuit of diodes 71a and 71b is connected in parallel to another serial circuit of other diodes 71c and 71d. Their intermediate connection points are connected to the outputs of power receiving circuit section 200.

Then, the output of rectifier 71 is connected to load 72.

Next, FIGS. 2 and 3 are used to explain a case where the non-contact power supply device shown in FIG. 1 is prepared at the vehicle and at a parking lot of the vehicle and to explain a relationship between a coupling coefficient (κ) between primary winding 101 and secondary winding 201.

In this embodiment, power receiving section 200 including secondary winding 200 and load section 7 are, for example, installed in the vehicle and power-transmission circuit section 100 including primary winding 101 and high-frequency wave alternating current power supply 6 are, for example, installed on a parking lot as an earth side.

In a case of the electrical automotive vehicle, load section 72 corresponds to, for example, a secondary cell.

Secondary winding 201 is, for example, equipped in a chassis of the vehicle. Then, a driver of the vehicle parks on the parking lot such that secondary winding 201 becomes an upper part of primary winding 101 so that the electric power is supplied from primary winding 101 to secondary winding 201 and the secondary cell included in load 72 is charged.

Figure 2B:
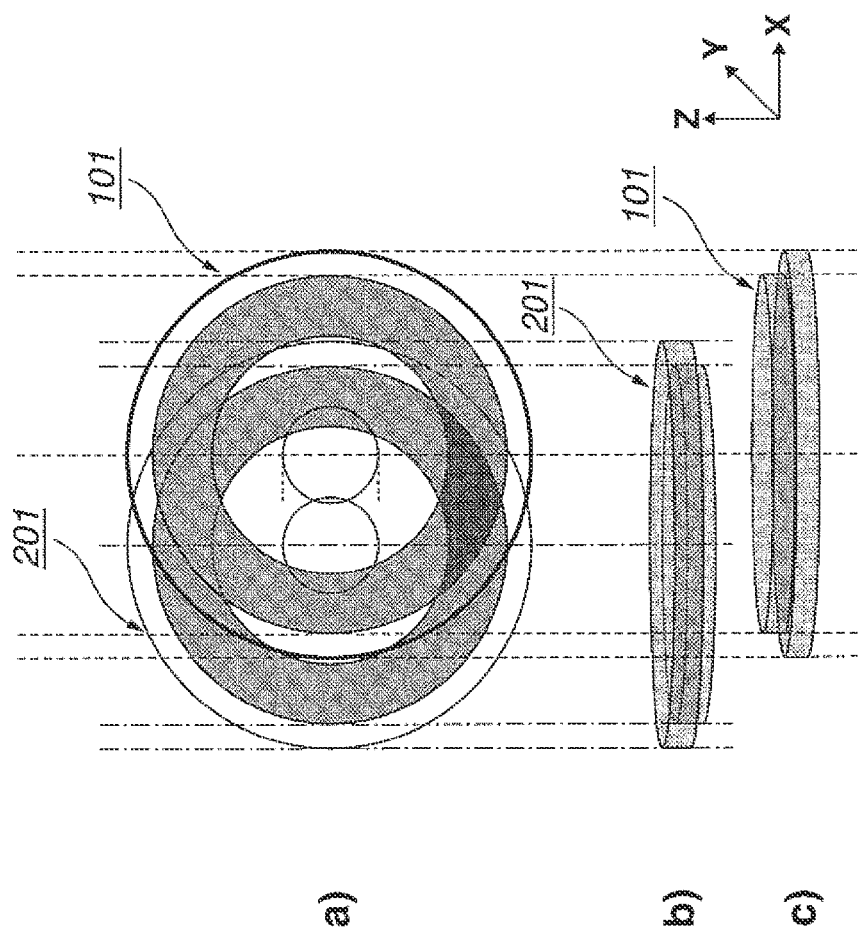
FIG. 2a is a plan view and a perspective view of a primary winding and a secondary winding shown in FIG. 1.
FIG. 2d is another plan view and another perspective view of the primary winding and the secondary winding shown in FIG. 1.

FIGS. 2a and 2d are a plan view of primary winding 101 and secondary winding 201 and a perspective view of primary winding 101 and secondary winding 201. In FIGS. 2a and 2b, X axis and Y axis are plane surface direction of primary winding of primary winding 101 and secondary winding 201 and Z axis denotes a height direction. In FIGS. 2a and 2b, a) shows the plan view of primary winding 101 and secondary winding 201, b) shows the perspective view of secondary winding 201, and c) shows the perspective view of primary winding 101. It should be noted that, for explanation purposes, both of primary winding and secondary winding are circular and the mutually same shape. However, it is not always necessary to form these shapes in the circular shape. It is not always necessary to form the same shapes as primary winding 101 and secondary winding 201.

As shown in FIG. 2a, the vehicle may be parked on the parking lot so that secondary winding 201 is made coincident with primary winding 101 in the X axis direction and the Y axis direction in the X axis and Y axis directions. Depending upon a skill of the vehicle driver, as shown in FIG. 2b, a relative position may often be deviated in the plane direction. In addition, since the height of the vehicle is different from a kind of the vehicle, a height between primary winding 101 and secondary winding 201 is different from the height of the vehicle.

FIG. 3 shows a variation of a coupling coefficient with respect to secondary winding 201 in the X axis (Y axis) and Z axis directions shown in FIGS. 2a and 2b.

As shown in FIG. 3, in a case where a center of primary winding 101 and the center of secondary winding 201 are made coincident with each other, a leakage of magnetic flux between primary winding 101 and secondary winding 201 is small so that the value of X axis in FIG. 3 corresponds to zero and coupling coefficient κ becomes large.

On the other hand, as shown in 2b with respect to FIG. 2a, in a case where the positions between primary winding 101 and secondary winding 201 are deviated in X axis direction, the leakage of magnetic flux is increased and, as shown in FIG. 3, coupling coefficient κ becomes decreased.

In addition, if the deviation in the Z axis direction (height) of primary winding 101 and secondary winding 201 is increased, coupling coefficient κ becomes decreased.

Incidentally, in the non-contact electric power supply device adopted in a charging of a cordless electrical equipment such as an electric toothbrush or electric shaver and the charging of a portable handy phone is not relatively moved between primary winding 101 and secondary winding 201 so that, as described above, the variation of the coupling coefficient is not be supposed. Therefore, with coupling coefficient (κ) fixed as a prerequisite, under a specific coupling coefficient (κ), the power factor is increased so that the electric power is efficiently supplied to power receiving circuit section 200. To achieve this, capacitors and inductors included in power transmission circuit 100 and power receiving section 200 are circuit designed.

Hereinafter, the power factor in the non-contact power supply device shown in FIG. 1 will be described using FIG. 4.

FIG. 4a shows a current characteristic with respect to time and a voltage characteristic with respect to time. A graph a denotes a voltage characteristic. A graph b denotes a current characteristic when the power factor is 0.85 with respect to the voltage characteristic of graph a. A graph c denotes a current characteristic in a case where the power factor is set to 0.5 with respect to the voltage characteristic of graph a. It should be noted that the current characteristics of graph b and graph c are waveforms in which only the phases are different with the mutually same amplitudes. In addition, FIG. 4b shows an electric power characteristic with respect to time, a1 in FIG. 4b being an instantaneous power characteristic when the power factor is set to 0.85 and shows the electric power characteristic of taking a product between a voltage of graph a in FIG. 4a and a current of graph b in FIG. 4a. Graph b1 is a characteristic graph of an instantaneous electric power characteristic when the power factor is 0.5 and an electric power waveform of a product taken between the voltage in graph a in FIG. 4a and the current of graph c. Graph b2 is an average electric power characteristic when the power factor is set to 0.5.

In FIG. 4b, a negative part of the instantaneous electric power corresponds to an electric power not consumed by load 72, in order to increase an effective electric power consumed by load 72, the negative part of the instantaneous electric power may be reduced. When comparing between graph a1 and graph b1, the reactive power when the power factor is set to 0.85 is smaller than the reactive power when the power factor is set to 0.5. Then, when comparing graph a2 with graph b2, an average electric power when the power factor is set to 0.85 is higher than the average electric power in a case where the power factor is set to 0.6. That is to say, the magnitudes of the input current to non-contact power supply section 10 and the input voltage to non-contact power supply section 10 are the same, the larger power factor can make the effective electric power larger.

Next, a relationship between the power factor and a power supply size of high-frequency alternating current power supply 6 will be described below with reference to FIGS. 5a and 5b.

FIG. 5a shows characteristics of the instantaneous electric power and the average electric power with respect to time. A graph a1 shows the characteristic of the instantaneous electric power in a case where power factor is set to 0.85. A graph a2 shows the characteristic of the average electric power in a case where the power factor is set to 0.35. A graph b1 denotes the current characteristic in a case where the power factor is set to 0.5 with respect to the voltage characteristic of graph a. It should be noted that, even in a case of FIG. 5b, the average electric power in a case where the power factor is set to 0.85 and the average electric power in a case where the power factor is set to 0.5 are mutually the same.

As shown in FIG. 5b, in order to provide the same average electric power, it is necessary to make the electric power in a case where the power factor is set to 0.51 is larger than the electric power in a case where the power factor is set to 0.85. Then, the power supply size (namely, a capacity) of high-frequency alternating current power supply 6 is calculated as voltage X current. The current in a case where the power factor is set to 0.5 is larger than the current in a case where the power factor is set to 0.85. Hence, the power supply size in a case where the power factor is set to 0.5 is larger than the power supply size in a case where the power factor is set to 0.85. Hence, by increasing the power factor, a small sizing of the power supply size can be achieved.

That is to say, this embodiment can, as will be described herein below, provide the non-contact power supply device which suppresses the reduction in the power factor even in a case where the coupling coefficient ($\kappa$) is varied.

FIG. 6 is a circuit block diagram of non-contact power supply section 10 of the non-contact power supply device in this embodiment. A left side of FIG. 6 corresponds to an input side and the alternating current power supply side and a right side of FIG. 6 corresponds to an output side and the load 72 side. Suppose now that an inductance of primary winding is $L_1$, an inductance of secondary winding 201 is $L_2$, an electrical capacitance of capacitor 102 is $C_{2s}$, an electrical capacitance of capacitor 202 is $C_{2p}$, and an electrical capacitance of capacitor 203 is $C_{2s}$.

In this embodiment, conditions of magnitudes of inductances of primary winding 101 and secondary winding 201 and magnitudes of capacitances of capacitors 102, 202, 203 are prescribed, a fundamental wave frequency ($f_0$) is set in the proximity to a resonance frequency ($f_1$) of an impedance ($Z_1$) of the primary side, and fundamental wave frequency ($f_0$) is set between one resonance frequency ($f_2$) of the secondary side and the fundamental wave frequency ($f_0$) is set between a resonance frequency ($f_2$) of an impedance ($Z2$) of the secondary side and a resonance frequency ($f_3$) thereof.

Figure 7:
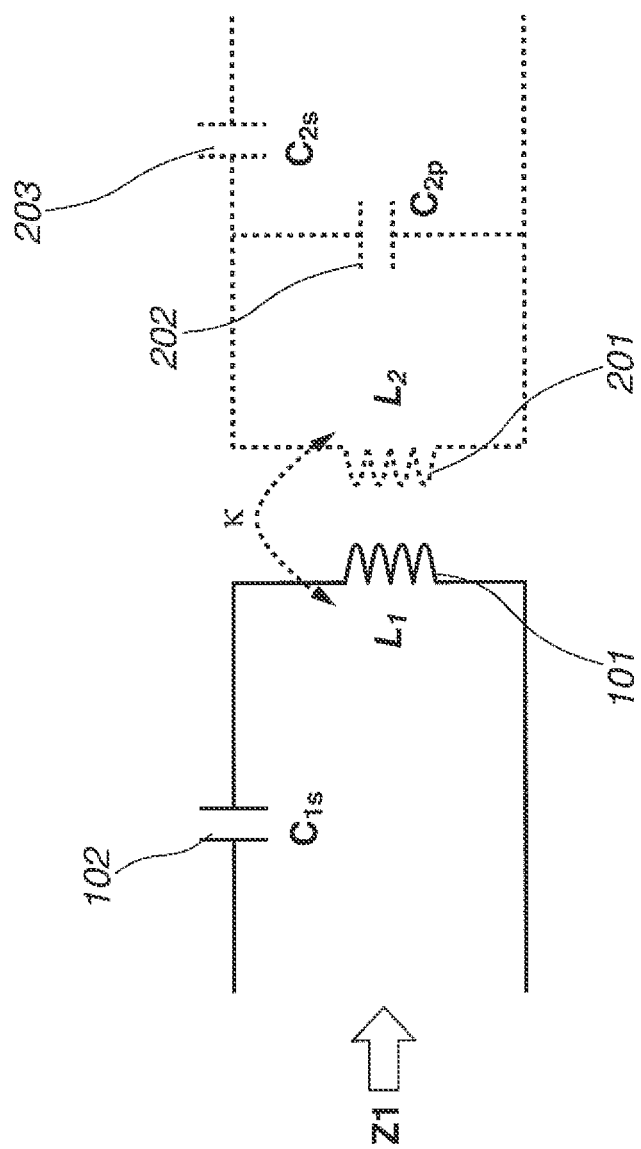
FIG. 7 is a circuit diagram of an equivalent circuit of a primary side circuit of the non-contact power supply section shown in FIG. 1.

First, electrical capacitance $C_{1s}$ of capacitor 102 will be described using FIG. 7. FIG. 7 shows a primary side (a transmission side) circuit from among the circuit of FIG. 6 and Z1 is the impedance of only the primary side viewed from alternating current power supply side 64 when the coupling coefficient ($\kappa$) is set to zero.

As shown in FIG. 7, the coupling coefficient ($\kappa$) between primary winding 101 and secondary winding 201 is zeroed ($\kappa$=0). The circuit at the primary side includes the resonance circuit by means of primary winding 101 and secondary winding 201 and the resonance frequency of the resonance circuit gives $f_1$. In addition, the impedance characteristic (Z1) is circuit designed to provide a minimal value at resonance frequency ($f_1$). Fundamental wave frequency ($f_0$) of alternating current power supply 64 is predetermined in accordance with the power supply used for the non-contact power supply device. Then, the resonance frequency ($f_1$) is the resonance frequency of a resonance circuit between primary winding ($L_1$) 101 and capacitor ($C_{1s}$) 102 and is set in the proximity of the fundamental wave frequency ($f_0$). Therefore, the fundamental wave frequency ($f_0$), the inductance ($L_1$), and the electrical capacitance ($C_{1s}$) satisfying these conditions can be expressed in the following equation (1).

[Equation 1]

$$C_{1s} = \frac{1}{L_1(2\pi \cdot f_0)^2} \quad \text{(Equation 1)}$$

Figure 8:
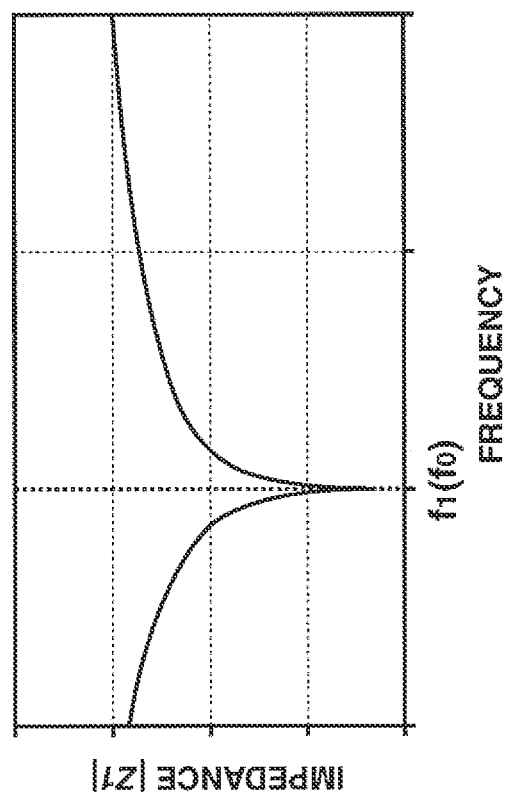
FIG. 8 is a graph representing an absolute value characteristic of an impedance (Z1) of only the primary side in the non-contact power supply section shown in FIG. 1.

Next, FIG. 8 shows an impedance characteristic of the circuit only at the primary side of FIG. 7. FIG. 8 shows a graph representing an absolute value characteristic of the impedance at the primary side circuit with respect to the frequency.

The resonance frequency ($f_1$) of the impedance (Z1) corresponds to a frequency at which a minimal value of the impedance characteristic indicates. As shown in FIG. 8, the fundamental wave frequency ($f_0$) is located in the proximity of resonance frequency ($f_1$) and circuit designed to satisfy the condition of equation 1. Thus, since, in non-contact power supply section 10, a required current to receive the electric power from the alternating current power supply 64 side can be suppressed to be low, an electric power efficiency can be increased.

Next, an electrical capacitance $C_{2p}$ of capacitor 202 and an electrical capacitance $C_{2s}$ of capacitor 203 will be explained using FIG. 9.

Figure 9:
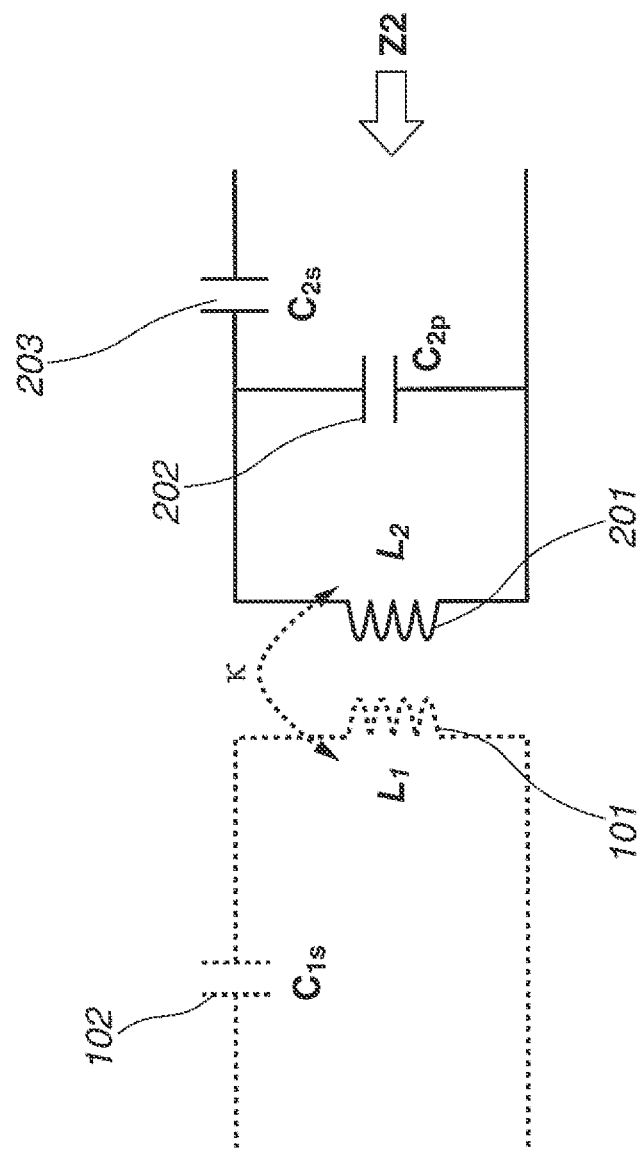
FIG. 9 is a circuit diagram of an equivalent circuit representing a secondary side circuit of the non-contact power supply section shown in FIG. 1.

FIG. 9 shows a parallel circuit between secondary winding 201 and capacitor 202 from among a secondary side (receiving side) circuit and Z2 denotes an impedance of only the secondary side viewed from the load side 72 when the coupling coefficient ($\kappa$) is zeroed (zero value).

As shown in FIG. 9, suppose that the coupling coefficient ($\kappa$) between primary winding 101 and secondary winding 201=0. The circuit at the secondary side includes: a first resonance circuit having secondary winding 201 and capacitor 202; and a second resonance circuit having capacitor 202 and capacitor 203. Then, suppose that the resonance frequency of the first resonance circuit is $f_3$, the resonance frequency of the second resonance circuit is $f_2$, the resonance frequency ($f_3$) is higher than the resonance frequency ($f_2$). Then, the circuit design is set such that the impedance characteristic (Z2) provides the resonance frequency ($f_2$) with the minimal value and the resonance frequency ($f_3$) with the maximal value. Then, fundamental wave frequency ($f_0$), the resonance frequency ($f_2$), and the resonance frequency ($f_3$) satisfying these conditions, are expressed in the following equation (2).

$$f_2 \leq f_1(f_5) < f_3 \quad \text{(Equation 2)}$$

In addition, the resonance frequency ($f_2$) and the resonance frequency ($f_3$) are expressed as shown in the following equations (3) and (4).

[Equation 3]

$$f_2 = \frac{1}{2\pi\sqrt{L_3(C_{2s}+C_{2p})}} \quad \text{(Equation 3)}$$

[Equation 4]

$$f_s = \frac{1}{2\pi\sqrt{L_2 C_{2p}}} \quad \text{(Equation 4)}$$

Then, the following equation (3) is introduced by substituting equations (1), (3), and (4) into equation (4).

[Equation 5]

$$\frac{1}{2\pi\sqrt{L_2(C_{2s}+C_{2p})}} \leq \frac{1}{2\pi\sqrt{L_1 C_{1s}}} < \frac{1}{2\pi\sqrt{L_2 C_{2p}}} \quad \text{(Equation 5)}$$

Figure 10:
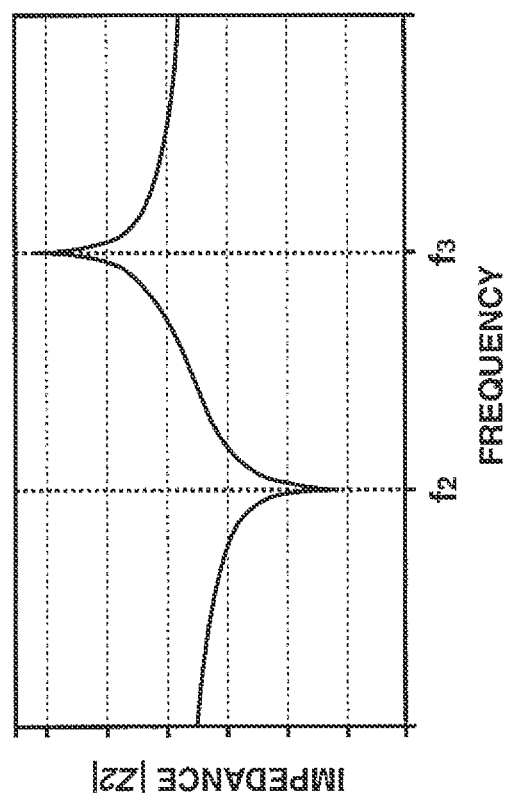
FIG. 10 is a graph representing an absolute value characteristic of an impedance (Z2) only of the secondary side in the non-contact power supply section shown in FIG. 1.

An absolute value characteristic of the impedance of the circuit at the secondary side of FIG. 9 is shown in FIG. 10. It should be noted that the impedance characteristic of FIG.

10 shows the absolute value characteristic graph of the impedance of Z2. As shown in FIG. 10, the impedance characteristic of Z2 provides the minimal value at the resonance frequency ($f_2$) and provides the maximal value at the resonance frequency ($f_3$).

That is to say, in this embodiment, the absolute value characteristic of impedance (Z2) is such that the minimal value is provided at the resonance frequency ($f_2$) and the maximal value is provided at the resonance frequency ($f_3$). Then, under the condition satisfying equation (5), the circuit design is carried out.

Figure 11B:
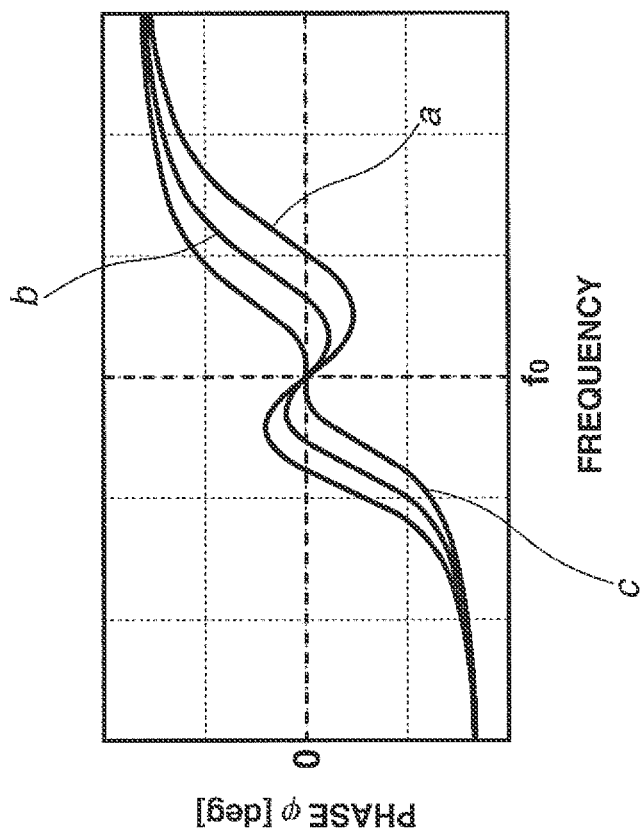
FIG. 11b is a graph representing a phase characteristic of the input impedance (Zin) with respect to a frequency in the non-contact power supply section shown in FIG. 1.

The absolute value characteristic and the phase characteristic of the input impedance in this embodiment which is circuit designed as described above will be explained using. FIGS. 11a and 11b. FIG. 11a shows an input impedance (Zin) characteristic with respect to the frequency in non-contact power supply section 10 and FIG. 11b shows a phase (φ) characteristic with respect to the frequency therein.

It should be noted that the input impedance is the impedance of non-contact power supply section 10 as viewed from alternating current power supply 64 side in a case of a predetermined coupling coefficient (κ). Graphs a in FIGS. 11a and 11b denote the characteristics in a case of the coupling coefficient of (κ1), graphs b in FIGS. 11a and 11b denote the characteristics in a case of the coupling coefficient of (κ2), graph c denotes the characteristic in a case of the coupling coefficient of (κ3). It should be noted that the value of κ1 is a largest, the value of κ2 is the second largest, and the value of κ3 is a smallest.

As shown in FIG. 11a, even if the coupling coefficient (κ) is varied, the input impedance (Zin) takes the maximal value at the fundamental wave frequency so that the input impedance at the fundamental wave frequency can be made large. In addition, as shown in FIG. 11b, even if the coupling coefficient (κ) is varied, the phase characteristic is approximately zero degree at the fundamental wave frequency. Therefore, even if the coupling coefficient (κ) is varied, the power factor can be maintained in the proximity of 1.

As described above, in this embodiment, the impedance characteristic of Z1 with respect to the frequency has the minimal value in the proximity of the frequency ($f_0$) of the fundamental wave component of alternating current power supply 64 and the impedance characteristic of Z2 with respect to the frequency has the frequency ($f_0$) between the frequency ($f_3$) which is nearest to frequency ($f_0$) and takes the maximal value and has the frequency ($f_2$) which is nearest to the frequency ($f_0$) and takes the minimal value. Thus, even in a case where the coupling coefficient (κ) is varied, a variation of the phase of the input impedance with respect to the fundamental wave frequency ($f_0$) is suppressed. Hence, the reduction of the power factor can be suppressed and, as a consequence, the power supply size of high-frequency wave alternating current power supply 6 can be made small.

Hereinafter, an explanation will be made in that non-contact power supply device in this embodiment gives a large power factor and a large output electric power as compared with the previously proposed non-contact power supply devices, using FIGS. 12 through 14.

Figure 12:
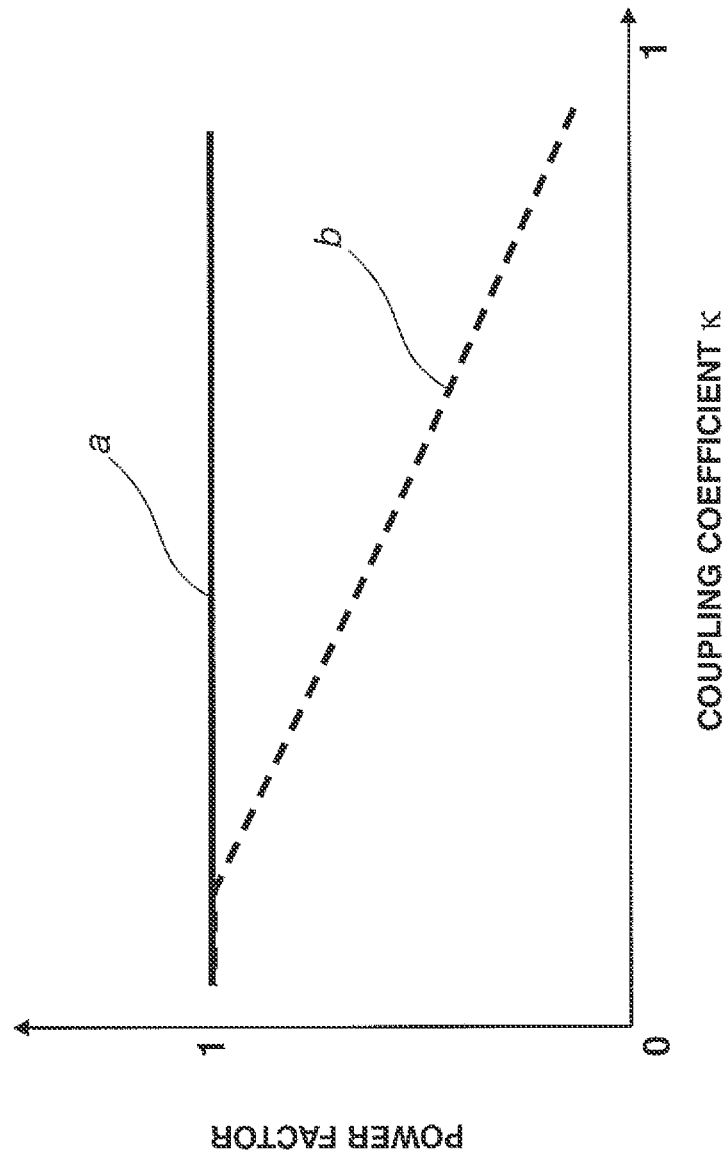
FIG. 12 is a graph representing a characteristic of the power factor with respect to a coupling coefficient κ of the non-contact power supply device in a comparative example and of the non-contact power supply device shown in FIG. 1.

FIG. 12 shows the characteristics of the power factor with respect to coupling coefficient κ in the non-contact power supply device in the case of this embodiment and in the case of the previously proposed non-contact power supply device. A graph a denotes a graph in the case of this embodiment and a graph b denotes a graph in the case of the previously proposed non-contact power supply device.

It should be noted that the previously proposed non-contact power supply device (a comparative example 1) is a circuit in which a capacitor is connected to the primary winding in parallel to the primary winding and another capacitor is connected to the secondary winding in parallel to the secondary winding and the power factor is viewed from the output side of non-contact power supply section 10.

In comparative example 1, the power factor is reduced with respect to the variation in the coupling coefficient. On the other hand, in this embodiment, although the coupling coefficient is varied, the power factor is not varied in the proximity of 1. Thus, in this embodiment, the power factor can be maintained in the proximity of 1 so that the reactive electric power can be suppressed. Consequently, the power supply size of the high-frequency wave alternating current power supply 6 and, in other words, the electrical capacitance (capacity) of voltage type inverter 63 can be suppressed.

Figure 13:
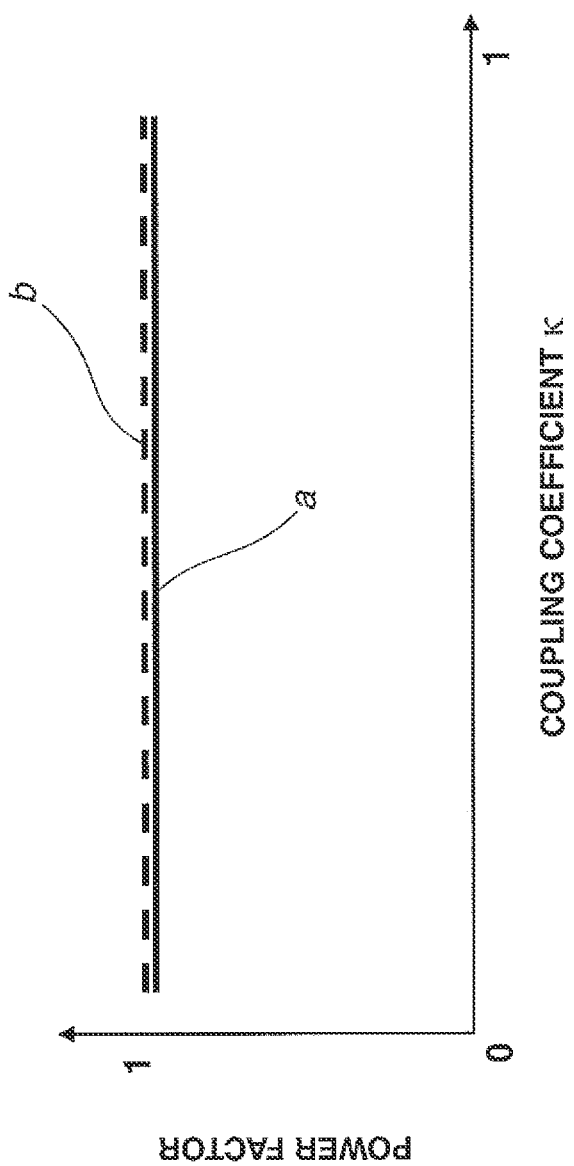
FIG. 13 is a characteristic graph of the power factor with respect to coupling coefficient κ in the comparative example of the non-contact power supply device and the non-contact power supply device shown in FIG. 1.
Figure 14:
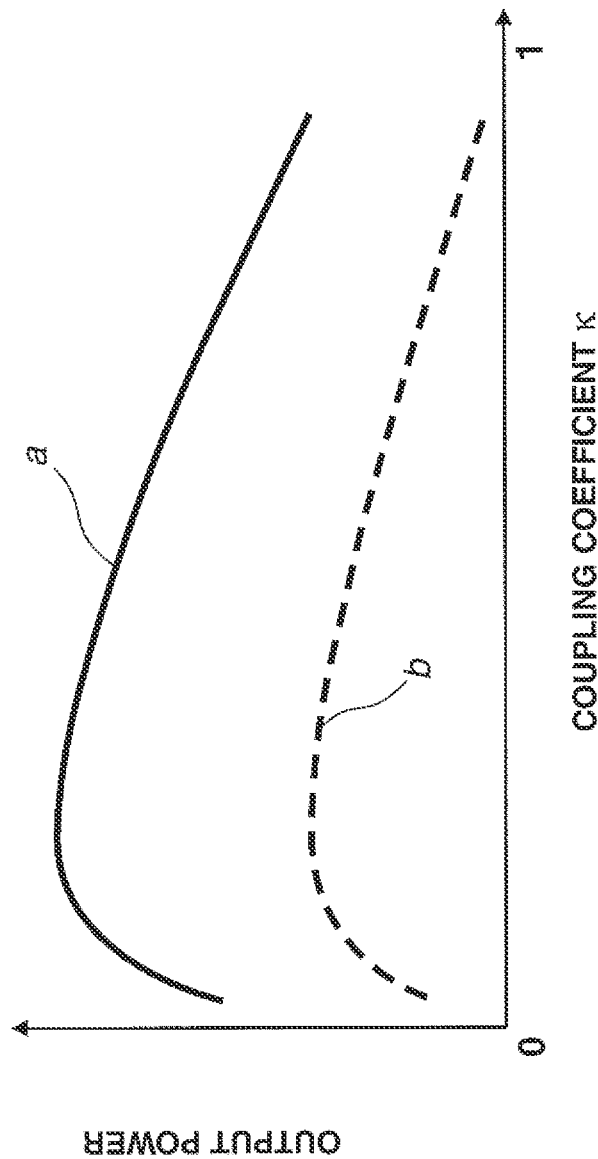
FIG. 14 is a characteristic graph of an output power with respect to coupling coefficient κ in a first comparative example of the non-contact power supply device and the non-contact power supply device shown in FIG. 1.

FIG. 13 shows the characteristics of the power factor with respect to coupling coefficient κ in the non-contact power supply device of this embodiment and the previously proposed non-contact power supply device. FIG. 14 shows the characteristics of the output power with respect to the coupling coefficient κ in the non-contact power supply device in this embodiment and in the previously proposed non-contact power supply device. A graph a denotes the characteristic graph in this embodiment and a graph b denotes the characteristic graph of the previously proposed non-contact power supply device. It should be noted that the previously proposed non-contact power supply device (a comparative example 2) shown in FIGS. 13 and 14 is a circuit in which a serial capacitor is connected to the primary winding and another serial capacitor is connected to the secondary winding, in the circuit portion of the non-contact power supply section.

As shown in FIG. 13, the power factor is not varied in the proximity of 1 with respect to the variation in the coupling coefficient in this embodiment and in comparative example 2. However, as shown in FIG. 14, in comparative example 2, since the voltage type inverter is driven, the output power of the non-contact power supply section becomes small. That is to say, in comparative example 2, there is often a case where a sufficient output power cannot be obtained even if the power factor is increased. On the other hand, in this embodiment, since the magnitude of input impedance (Zin) becomes large, the output electric power of non-contact power supply section 10 becomes large and the power factor can be maintained at a high state.

Figure 15:
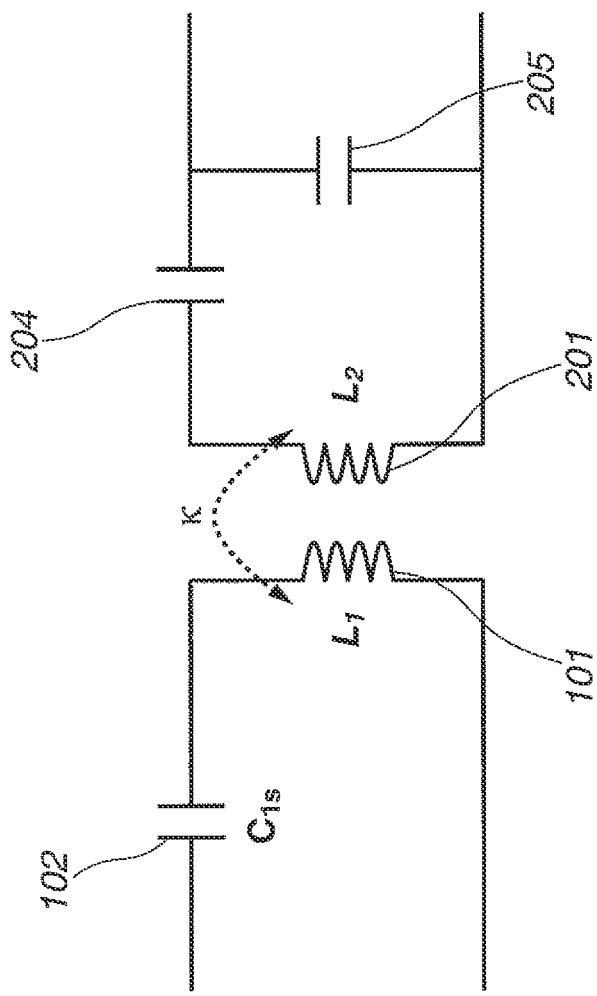
FIG. 15 is a circuit diagram of the non-contact power supply section of a modification of the non-contact power supply device shown in FIG. 1.
Figure 16:
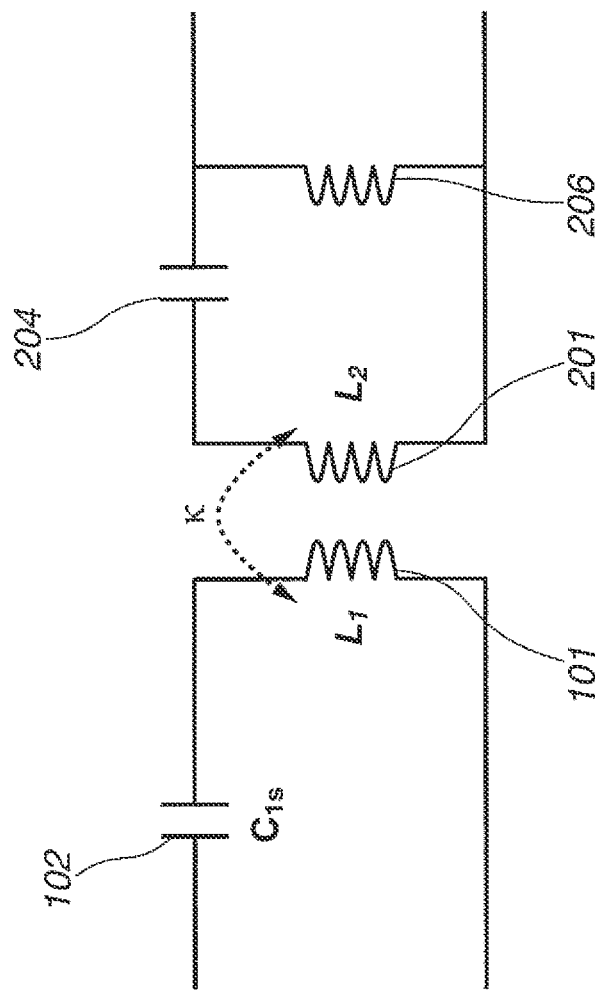
FIG. 16 is a circuit diagram of the non-contact power supply section of another modification of the non-contact power supply device shown in FIG. 1.
Figure 17:
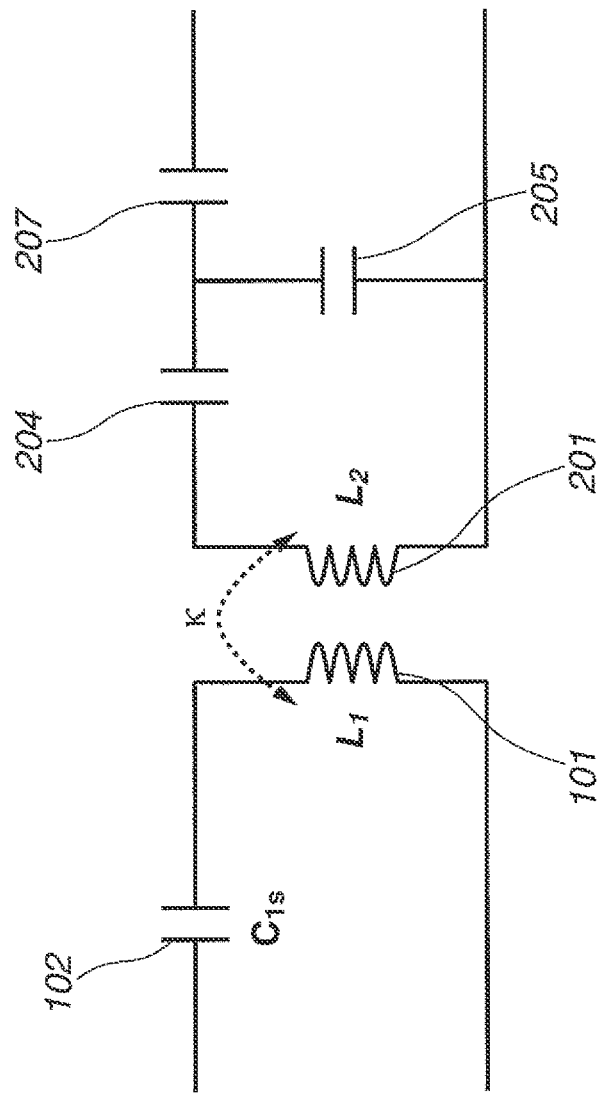
FIG. 17 is a circuit diagram of the non-contact power supply section of a still another modification of the non-contact power supply device shown in FIG. 1.

It should be noted that the circuit of non-contact power supply section 10 is not always the circuit shown in FIG. 1 but may be the circuit shown in FIGS. 15, 16, and 17 unless the above-described conditions are satisfied. That is to say, the conditions are such that the impedance characteristic of Z1 with respect to the frequency has the minimal value in the proximity of the frequency ($f_0$) of the fundamental wave component of high-frequency wave alternating current power supply 6 and the impedance characteristic of Z2 with respect to the frequency has the frequency ($f_0$) between the frequency ($f_3$) nearest to frequency ($f_0$) but takes the maximal value and the frequency ($f_2$) nearest to the frequency ($f_0$) but takes the minimal value.

For example, the circuit shown in FIGS. 15 through 17 may be accepted if the conditions described above are satisfied. FIGS. 15 through 17 are circuit diagrams of non-contact power supply section 10 related to modifications of the non-contact power supply device according to the present invention.

As shown in FIG. 15, the non-contact power supply device 10 in one of the modifications to this embodiment is such that capacitor 102 is serially connected to primary winding 101, capacitor 204 is serially connected to secondary winding 201, and capacitor 205 is connected in parallel to a serial circuit of secondary winding 201 and capacitor 204. In addition, as shown in FIG. 16, in another modification to this embodiment is such that, in non-contact power supply section 10, a capacitor 102 is serially connected to primary winding 101, another capacitor 204 is serially connected to secondary winding 201, and a coil 206 is connected in parallel to a serial circuit of secondary winding 206 and capacitor 204. In addition, as shown in FIG. 17, in non-contact power supply section 10 in a still another modification to this embodiment, capacitor 102 is serially connected to primary winding 101, the serial circuit of capacitor 204 and capacitor 207 is serially connected to secondary winding 201, capacitor 205 is connected in parallel to the serial circuit of secondary winding 201 and capacitor 204 and connected to a junction point between capacitor 204 and capacitor 207.

It should be noted that, in a case where a circuit section at the secondary side of non-contact power supply section 10 includes a plurality of resonance circuits and the characteristic of impedance (Z2) includes a plurality of minimal values, the frequency which is nearest to fundamental wave frequency ($f_0$) and at which the minimal value is provided is assumed to be $f_2$. Similarly, in a case where the characteristic of impedance (Z2) includes a plurality of maximal values, the frequency which is nearest to fundamental wave frequency ($f_0$) and at which a maximal value is provided is assumed to be $f_3$. That is to say, the characteristic of impedance (Z2) has the frequency ($f_0$) between the frequency ($f_3$) nearest to the frequency ($f_0$) and providing the maximal value and the frequency ($f_2$) nearest to the frequency ($f_0$) and providing the minimal value.

Second Preferred Embodiments

FIG. 18(a) shows an absolute value characteristic of the impedance (Z1) of the non-contact power supply section of the non-contact power supply device related to a second preferred embodiment according to the present invention. FIG. 18(b) shows another absolute value characteristic of the impedance (Z2) thereof. A difference point of the second embodiment from the first embodiment is that the resonance frequency ($f_2$) is set within a range of a half-value width of the resonance frequency ($f_1$). The other structures of the second embodiment are the same as those of the first embodiment. Thus, the description of the first embodiment is appropriately applied to the description of the second embodiment.

As shown in FIG. 18(a), the fundamental wave frequency ($f_0$) of alternating current power supply 64 is set in the proximity of resonance frequency ($f_1$) at which the minimal value of impendance (Z1) is provided. $\Delta f$ denotes a half-value width of the frequency ($f_1$). Suppose that an absolute value of the impedance of the frequency ($f_1$) is $Z1(f_1)$, frequencies satisfying $Z1(f_1)/2$ is $f_{1a}$, $f_{1b}$.
The half-value width is calculated as $f_{1a}-f_{1b}$.
Then, the half-width value ($\Delta f$) is expressed in the following equation using the inductance ($L_1$) of primary winding 101 and a winding resistance (r) of primary winding 101.

[Equation 6]

$$\Delta f = \frac{r}{2\pi L_1} \quad \text{(Equation 6)}$$

As shown in FIG. 18(b), the resonance frequency ($f_2$) at which the minimal value of impedance (22) is provided is set within a range of half-value width ($\Delta f$) with resonance frequency ($f_1$) as a center. In addition, the resonance frequency ($f_2$) is a frequency lower than the resonance frequency ($f_3$) of the impedance (Z2) at which the maximum value is provided.

Next, electrical capacitance $C_{1s}$ of capacitor 102, electrical capacitance $C_{2p}$ of capacitor 202, and electrical capacitance $C_{2b}$ of capacitor 203 will be described below. Electrical capacitance $C_{1s}$ of capacitor 102 is expressed in the above-described equation 1 from the relationship between resonance frequency ($f_1$) and fundamental wave frequency ($f_0$).

The fundamental wave frequency ($f_0$) is a frequency lower than resonance frequency ($f_3$). The resonance frequency ($f_3$) is the frequency of the resonance circuit of secondary winding ($L_2$) 201 and capacitor ($C_{2p}$) 202. Hence, electrical capacitance $C_{2p}$ of capacitor 202 is expressed in the following equation 7.

[Equation 7]

$$C_{2p} < \frac{L_1}{L_2} C_{1p} \quad \text{(Equation 7)}$$

Then, since the resonance frequency ($f_2$) is set within the range of the half-value width ($\Delta f$) of the resonance frequency ($f_1$), $f_2 \approx f_1$. Since the resonance frequency ($f_2$) is the frequency of the resonance circuit comprising the secondary winding ($L_2$), the capacitor ($C_{2p}$) 202, and the capacitor ($C_{2s}$) 203, the electrical capacitance of capacitor 203 is expressed in the following equation (8).

[Equation 8]

$$(C_{2s} + C_{2p}) = \frac{L_1}{L_2} C_{1p} \quad \text{(Equation 8)}$$

That is to say, the electrical capacitance $C_{1s}$ of capacitor 102, the electrical capacitance of capacitor 202, and the electrical capacitance $C_{2s}$ of capacitor 203 are set to satisfy equations (6) through (8). Therefore, in this embodiment, the phase of input impedance (Zin) at the fundamental wave frequency ($f_0$) can be set to the proximity of zero even if the coupling coefficient ($\kappa$) is varied.

Consequently, the power factor can be maintained at substantially 1 (in the proximity of 1) with respect to the variation of the coupling coefficient ($\kappa$), the power supply size can be made small, and the capacitance (capacity) of the voltage type inverter can be suppressed.

As described above, in this embodiment, the frequency ($f_2$) at which the minimal value of Z2 is provided is set to be within the half-value width of the frequency ($f_1$) at which the minimal value of Z1 is provided. Thus, even if the coupling coefficient ($\kappa$) is varied, the variation of the phase of the input impedance with respect to the fundamental wave frequency ($f_0$) is suppressed. The reduction in the power factor can be suppressed and, as a consequence, the power supply size of high-frequency wave alternating current power supply 6 can be reduced.

In addition, in this embodiment, the electrical capacitance ($C1s$) of capacitor 102, the inductance (L1) of primary winding 101, fundamental wave frequency ($f_0$), the electrical capacitance ($C_{2p}$) of capacitor 202, the electrical capacitance ($C_{2s}$) of capacitor 203, and the inductance ($L_2$) of the secondary winding (201) satisfies the conditions shown in the following equations (9) and (10).

[Equation 9]

$$C_{1s} = \frac{1}{L_1(2\pi \cdot f_0)^2} \quad \text{(Equation 9)}$$

[Equation 10]

$$C_{2p} < \frac{L_1}{L_2} C_{1p} = C_{2s} + C_{2p} \quad \text{(Equation 10)}$$

Thus, even in a case where the coupling coefficient (κ) is varied, the variation of the phase of the input impedance with respect to fundamental wave frequency ($f_0$) is suppressed so that the reduction of the power factor can be suppressed. Consequently, the power supply size of high frequency alternating current power-supply 6 can be made small, it should be noted that equation (9) is the same as equation (1) and equation (10) can be derived from equations (7) and (8).

Hereinafter, the non-contact power supply device in this embodiment has the larger power factor than the previously proposed non-contact power supply device according to the absolute value characteristic and the phase characteristic of the impedance described above. This feature will be explained using FIGS. 19 (a) through 22.

Figure 19A:
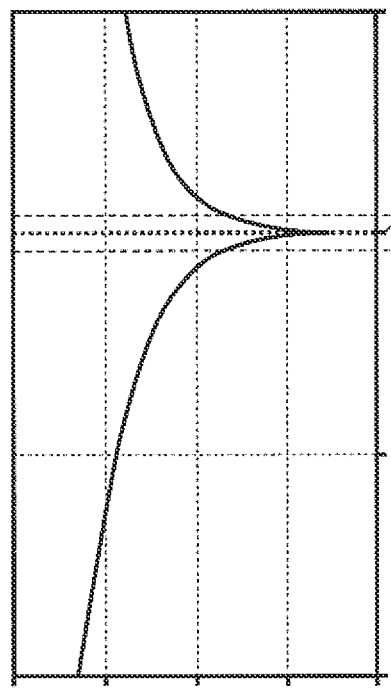
FIGS. 19(a) and 19(b) are graphs representing impedance characteristics of the non-contact power supply section of the non-contact power supply device related to a second comparative example to the second embodiment, FIG. 19(a)
Figure 19B:
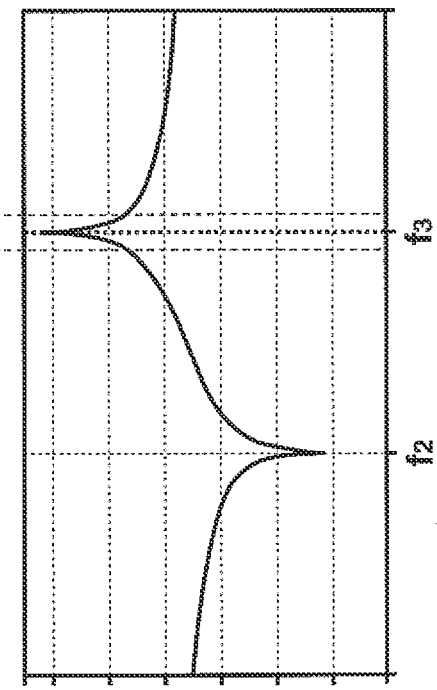

FIG. 19(a) shows the absolute value characteristic of the impedance (Z1) of the non-contact power supply section of the non-contact power supply device related to a comparative example 3 different from this embodiment. FIG. 19(b) shows the absolute value characteristic of the impendance (Z2) thereof. In comparative example 3, as is different from this embodiment, the resonance frequency ($f_2$) is set out of the range of the half-value width of the resonance frequency ($f_1$) and the resonance frequency ($f_3$) is set within the range of the half-value width of the resonance frequency ($f_1$).

FIG. 20 shows a graph representing the characteristic of the power factor with respect to the coupling coefficient (κ) in (the previously proposed) non-contact power supply section 10 that has the characteristics of FIGS. 19(a) and 19(b). As shown in FIG. 20, in comparative example 3, the power factor is reduced due to the variation in the coupling coefficient.

FIG. 21(a) shows the absolute value characteristic of the impedance (Z1) of the non-contact power supply section of the non-contact power supply device related to a comparative example 4 and FIG. 21(b) shows the absolute value characteristic of impendance (Z2).

FIG. 22 shows the graph representing the characteristic of the power factor with respect to the coupling coefficient (κ), in non-contact power supply device 10 having the characteristic shown in FIG. 21. As shown in FIG. 22, in comparative example 4, with respect to the variation in the coupling coefficient (κ), the power factor is reduced.

That is to say, as described in comparative example 3 and comparative example 4, in a case where the resonance frequency ($f_2$) is set without the range of the half-value width of the resonance frequency ($f_1$), the power factor is reduced but, in this embodiment, the resonance frequency ($f_2$) is set within the range of the half-value width of the resonance frequency ($f_1$). Hence, the reduction of the power factor with respect to the variation of the coupling coefficient (κ) can be suppressed.

It should be noted that above-described capacitor 102 corresponds to a first capacitor according to the present invention, capacitor 202 corresponds to a second capacitor according to the present invention, and capacitor 203 corresponds to a third capacitor according to the present invention.

Third Preferred Embodiment

FIG. 23 is a circuit diagram representing an equivalent circuit of the non-contact power supply section of the non-contact power supply device in a third preferred embodiment according to the present invention. The difference point of the third embodiment from the first embodiment is that, according to the characteristic of a zero (point) of the input impedance (Zin), the circuit structure of the non-contact power supply device is prescribed. The other structures in this embodiment is the same as those in the first embodiment. Hence, the description of the first and second embodiments is appropriately applied to the description of the third embodiment).

As shown in FIG. 23, a resistor (R) as an equivalent load resistance of load section 7 is connected to the output side of non-contact power supply section 10. Then, on a basis of the circuit shown in FIG. 23, the impedance characteristic (Zin) viewed from the output side of high-frequency alternating current power supply 6 is Laplace transformed as shown in the following equation (11).

$$Z_{in} = \frac{-C_{1s}C_{2p}C_{2s}R(M^2 - L_1L_2)s^5 + C_{1s}(C_{2p} + C_{2x})(M^2 - L_1L_2)s^4 - C_3R(C_{1s}L_1 + C_{2p}L_2)s^3}{C_{1s}C_{2p}C_{2x}L_2R_s^4 + L_2C_{1x}(C_{2p} + C_3)s^3 + C_{1s}C_{2x}R_s^2 + C_{1s}s}$$

$$\frac{(L_1C_{1s} + L_2C_{2p} + L_2C_{2s})^2 - C_{2x}Rs - 1}{C_{1s}C_{2p}C_{2x}L_2R_s^4 + L_2C_{1s}(C_{2p} + C_3)s^3 + C_{1s}C_{2x}R_s^2 + C_{1s}s}$$

[Equation 11]

Wherein M described in equation (11) denotes a mutual inductance and is expressed in the following equation (12).

$$M = \kappa\sqrt{L_1 L_2} \quad \text{(Equation 12)}$$

If a representative root approximation is carried out for the impedance characteristic using a root near to an imaginary axis which gives a large influence on the circuit characteristic, the impedance characteristic (Zin) can be approximated to an equation 13.

[Equation 13]

$$Zin \cong A \frac{|S - \gamma_1||S - \gamma_2|}{S|S - \lambda|} \quad \text{[Equation 13]}$$

In equation (13), λ is a pole of a representative root and a zero point is denoted by λ.

FIG. 24 is a graph of a pole locus of the impedance characteristic (Zin) expressed in a complex plane. FIG. 24 represents representative characteristic roots which give a large influence on the circuit characteristic from among the poles of equation (11). That is to say, FIG. 24 shows a pole and a zero point 1 nearest to an imaginary axis side and a zero point 2 which is a second nearest to the imaginary axis. It should be noted that the drive point corresponds to the fundamental wave frequency ($f_0$) of high-frequency wave alternating current power supply 6.

When coupling coefficient κ between primary winding 101 and secondary winding 201 is increased from the proximity of 0 (in FIG. 24, 0 corresponds to "small"), each of zero point 1 and zero point 2 draws a locus as shown in FIG. 24. Together with the increase in the coupling coefficient, zero point 1 is moved to approach to the imaginary axis and zero point 2 is moved away from the imaginary axis. In other words, in FIG. 24, zero point 1 and zero point 2 are mutually separated from each other with a middle point of a line connected between zero point 1 and zero point 2 as a center and take a symmetrical locus with respect to the middle point. That is to say, zero point 1 and zero point 2 take a mutually opposite locus accompanied by the variation of the coupling coefficient (κ). In addition, the pole is hardly moved with respect to the variation of the coupling coefficient.

As described above, in a case where, in this embodiment, the impedance characteristic (Zin) of the circuit shown in FIG. 23 is expressed in the complex plane, a first zero point nearest to the imaginary axis (corresponds to zero point 1 in FIG. 24) and a second zero point (corresponds to zero point 2 in FIG. 24) second nearest to the imaginary axis take a locus of mutually opposite directions accompanied by the variation in the coupling coefficient (κ). Thus, even in a case where the coupling coefficient (κ) is varied, the variation of the phase of the input impedance with respect to fundamental wave frequency ($f_0$) is suppressed so that the reduction in the power factor can be suppressed.

Consequently, the power supply size of high-frequency alternating current power supply 6 can be made small.

Fourth Preferred Embodiment

FIGS. 25a and 25b show absolute value characteristics of the impedance characteristic of the circuit of only the secondary side in the non-contact power supply section of the non-contact power supply device related to a fourth preferred embodiment according to the present invention. A difference point of the fourth embodiment from the first embodiment is that an absolute value of the input impedance (Zin) is set in accordance with a frequency band between the resonance frequency ($f_2$) and the resonance frequency ($f_3$). The other structures of the fourth embodiment are the same as those of the first embodiment and, therefore, the description of the first, second embodiment is applied to the description of the fourth embodiment.

FIGS. 25a and 25b are graphs representing the absolute value characteristics of the impedance of Z2. A frequency band (F1) between the resonance frequency ($f_2$) and the resonance frequency ($f_3$) has a narrower frequency band (F1) between the resonance frequency ($f_2$) and the resonance frequency ($f_3$) shown in FIG. 25a than a frequency band (F2) between resonance frequency ($f_2$) and resonance frequency ($f_3$) shown in FIG. 25b. It should be noted that F1 and F2 are expressed in an absolute value of a difference between $f_2$ and $f_3$.

FIG. 26 shows the characteristic of the absolute value of the input impedance (Zin) with respect to the coupling coefficient (κ). A graph a in FIG. 26 shows the absolute value characteristic of the input impedance when the frequency band is set to F1 and a graph b in FIG. 26 shows the absolute value characteristic of the input impedance (Zin) when the frequency band is set to F2.

As shown in FIG. 26, as the frequency band (width) between the resonance frequency ($f_2$) and the resonance frequency ($f_3$) becomes narrower, the absolute value of the input impedance (Zin) becomes larger. That is to say, in this embodiment, if a width of the frequency band between the resonance frequency ($f_2$) and the resonance frequency ($f_3$) is set so that the absolute value of the input impedance (Zin) can freely be designed.

As described above, in this embodiment, the value of the impedance (Zin) as viewed from the output side of high-frequency alternating current supply 6 is set in accordance with the frequency band between the frequency ($f_2$) at which the minimal value of the impedance (Z2) is provided and the frequency ($f_3$) at which the maximal value of the impedance (Z2) is provided. Thus, the value of the input impedance (Zin) can be enlarged by adjusting the frequency band. Hence, the electric power from high-frequency wave a item a ting current power supply 6 can be supplied to the load side efficiently. Consequently, the power supply size of high-frequency wave alternating current 6 can be made small.

Fifth Preferred Embodiments

FIG. 27 shows a circuit diagram of a fifth preferred embodiment of the non-contact power supply section of the non-contact power supply device according to the present invention.

The circuit structure of non-contact power supply section 10 in this embodiment is different from the first embodiment. The other structure of the non-contact power supply device is the same as the first embodiment and the description of the first, second, third, and fourth embodiments will appropriately be applied to the description of the fifth embodiment.

As shown in FIG. 27, capacitor 103 is connected in parallel to primary winding 101, capacitor 104 is serially connected to the parallel circuit of primary winding 101 and capacitor 103, and a capacitor 208 is serially connected to secondary winding 201.

The impedance characteristic of the circuit only of the primary side of the circuit shown in FIG. 27 is shown in FIG. 28. FIG. 28 shows a graph representing the absolute value characteristic of the impedance (Z1) of the circuit of the primary side.

As shown in FIG. 28, the impedance characteristic of Z1 which provides the minimal value at the resonance frequency ($f_2$) and provides the maximal value at the resonance frequency ($f_3$). The resonance frequency ($f_2$) is a resonance frequency of the resonance circuit constituted by primary winding 101, capacitor 103, and capacitor 104 and the resonance frequency ($f_3$) is a resonance frequency of the resonance circuit constituted by primary winding 101 and capacitor 103. Then, in this embodiment, the impedance characteristic of Z1 has the fundamental wave frequency ($f_0$) of high-frequency wave alternating current power supply between the resonance frequency ($f_2$) and the resonance frequency ($f_3$).

The impedance characteristic of the circuit only of the secondary side of the circuit in FIG. 2 is shown in FIG. 29. FIG. 29 shows a graph representing an absolute value characteristic of the impedance (Z2) of the circuit of the secondary side with respect to the frequency.

As shown in FIG. 29, the impedance characteristic of Z2 with respect to the frequency, in this embodiment, is such that the frequency ($f_0$) is provided between the frequency ($f_3$) which is nearest to the frequency ($f_0$) and at which the maximal value is provided and the frequency ($f_2$) which is nearest to the frequency ($f_0$) and at which the minimal value is provided and the impedance characteristic with respect to the frequency of Z2 provides the minimal value in the proximity of the frequency ($f_0$) of the fundamental wave component of alternating current power supply 64.

Thus, even if the coupling coefficient (κ) is varied, the variation of the phase of the input impedance with respect to the fundamental wave frequency ($f_0$) is suppressed. Hence, the reduction of the power factor can be suppressed. Consequently, the power supply size of high-frequency alternating current power supply 6 can be made small.

As described above, in this embodiment, the impedance characteristic of Z1 with respect to the frequency has the frequency ($f_0$) between the frequency ($f_3$) nearest to the frequency ($f_0$) and at which the maximal value is provided and the frequency ($f_2$) nearest to the frequency ($f_0$) and at which the minimal value is provided and the impedance characteristic of Z2 with respect to the frequency has the minimal value in the proximity of the frequency ($f_0$) of the fundamental wave component of alternating current power supply 64. Thus, even if the coupling coefficient (κ) is varied, the variation of the phase of the input impedance with respect to the fundamental wave frequency ($f_0$) is suppressed. Hence, the reduction of the power factor can be suppressed. Consequently, the power supply size of high-frequency alternating current power supply 6 can be made small.

It should be noted that, in this embodiment, the circuit shown in FIG. 27 corresponds to a circuit into which the circuit structure other than primary winding 101 of the primary side of the circuit shown in FIG. 6 and the circuit structure other than secondary winding 201 of the secondary side are reversed. Thus, the condition such that the resonance frequency ($f_2$) of Z2 is set within the range of the half-value width of the resonance frequency ($f_1$) of Z1 may be reversed between the primary side and the secondary side. That is to say, in this embodiment, in the circuit shown in FIG. 27, the frequency ($f_2$) at which the minimal value is provided is set within the range of the half-value width of the frequency at which the minimal value of Z2 is provided. Thus, even if the coupling coefficient (κ) is varied, the variation of the phase of the input impendance with respect to the fundamental wave frequency ($f_0$) is suppressed. Thus, the reduction of the power factor can be suppressed. Consequently, the power supply size of high-frequency alternating current power supply 6 can be made small.

It should be noted that it is not always necessary to realize the circuit of non-contact power supply section 10 by the circuit shown in FIG. 27. Only if the conditions such that the impedance characteristic of Z1 with respect to the frequency has the frequency ($f_0$) between the frequency ($f_3$) nearest to the frequency ($f_0$) and at which the maximal value is provided and the frequency ($f_2$) nearest to the frequency ($f_0$) and at which the minimal value is provided and the impedance characteristic of Z2 with respect to the frequency has the minimal value in the proximity of the frequency ($f_0$) of the fundamental wave component of alternating current power supply 64 are satisfied, the circuit shown in FIGS. 30 and 31 may be accepted. FIGS. 30 and 31 are circuit diagrams of modifications to the fifth embodiment of non-contact power supply section 10 of the non-contact power supply device.

As shown in FIG. 30, the non-contact power-supply section 10 related to the modification to the fifth preferred embodiment has the circuit structure such that capacity 105 is serially connected to primary winding 101 and capacitor 106 is connected in parallel to a serial circuit of primary winding 101 and capacitor 105. Then, as shown in FIG. 31, non-contact power supply section 10 related to another modification of the fifth embodiment is such that capacitor 105 is serially connected to primary winding 101, capacitor 106 is connected in parallel to the serial circuit of primary winding 101 and capacitor 105 and a coil 107 is connected to a junction point of capacitor 105 and capacitor 106.

The invention claimed is:

1. A non-contact power supply device, comprising:
   a primary winding; and
   a secondary winding to which an electric power is supplied from an alternating current power supply via the primary winding,
   wherein an impedance characteristic of a first impedance with respect to a frequency is such that a minimal value is provided in the proximity of a frequency of a fundamental wave component of the alternating current power supply and another impedance characteristic of a second impedance with respect to the frequency is such that the frequency of the fundamental wave component is provided between (1) another frequency which is nearest to the frequency of the fundamental wave component and at which a maximal value is provided and (2) a still another frequency which is nearest to the frequency of the fundamental wave component and at which the minimal value is provided,
   wherein the first impedance is the impedance of only a primary side viewed from an output side of the alternating current power supply, with a coupling coefficient between the primary winding and the secondary winding set to a zero value, and the second impedance is the impedance of only a secondary side viewed from a load side connected to the secondary winding, with the coupling coefficient between the primary winding and the secondary winding set to a zero value.

2. The non-contact power supply device as claimed in claim 1, wherein the frequency of the second impedance at which the minimal value is provided is set within a range of a half-value width of the frequency of the first impedance at which the minimal value is provided.

3. The non-contact power supply device as claimed in claim 1, wherein the non-contact power supply device has such a circuit structure that a first capacitor is connected in series with the primary winding and a third capacitor is connected in series with a parallel circuit of the secondary winding and a second capacitor and satisfies the following conditions:

$$C_{1S} = \frac{1}{L_1(2\pi \cdot f_0)^2}$$

and $$C_{2p} < \frac{L_1}{L_2}C_{1p} = C_{2s} + C_{2p}$$

wherein $C_{1s}$ denotes an electrical capacitance of the first capacitor, $L_1$ denotes an inductance of the primary winding, $f_0$ denotes the frequency of the fundamental wave component, $C_{2p}$ denotes an electrical capacitance of the second capacitor, $C_{2s}$ denotes an electrical capacitance of the third capacitor, and $L_2$ denotes an inductance of the secondary winding.

4. The non-contact power supply device as claimed in claim 1, wherein the non-contact power supply device has such a circuit structure that a first capacitor is connected in series with the primary winding, a third capacitor is connected in series with a parallel circuit of the secondary winding and a second capacitor, and in a case where an impedance characteristic viewed from an output side of the alternating current power supply is represented on a complex plane, a first zero point nearest to an imaginary axis and a second zero point second nearest to the imaginary axis take mutually opposite loci accompanied by a variation in a coupling coefficient between the primary winding and the secondary winding.

5. The non-contact power supply device as claimed in claim 1, wherein a value of the impedance viewed from the output side of the alternating current power supply is set in accordance with a frequency band between the frequency at which the second impedance provides the minimal value and the frequency at which the second impedance provides the maximal value.

6. A non-contact power supply device, comprising:
a primary winding; and
a secondary winding to which an electric power is supplied from an alternating current power supply via the primary winding,
wherein an impedance characteristic of a first impedance with respect to a frequency is such that a frequency of a fundamental wave component of the alternating current power supply is provided between (1) another frequency which is nearest to the frequency of the fundamental wave component and at which a maximal value is provided and (2) a still another frequency which is nearest to the frequency of the fundamental wave component and at which a minimal value is provided and an impedance characteristic of a second impedance with respect to a frequency is such that the minimal value is provided in the proximity of the frequency of the fundamental wave component,
wherein the first impedance is the impedance of only a primary side viewed from an output side of the alternating current power supply, with a coupling coefficient between the primary winding and the secondary winding set to a zero value and the second impedance is the impedance of only a secondary side viewed from a load side connected to the secondary winding with the coupling coefficient between the primary winding and the secondary winding set to a zero value.

7. The non-contact power supply device as claimed in claim 6, wherein the frequency at which the first impedance provides the minimal value is set within a range of a half-value width of the frequency at which the second impedance provides the minimal value.

* * * * *